(12) United States Patent
Bovenschulte et al.

(10) Patent No.: US 8,613,024 B2
(45) Date of Patent: Dec. 17, 2013

(54) CROSS-PLATFORM PREDICTIVE POPULARITY RATINGS FOR USE IN INTERACTIVE TELEVISION APPLICATIONS

(75) Inventors: David Bovenschulte, River Vale, NJ (US); Edgar Fereira, Stamford, CT (US)

(73) Assignee: United Video Properties, Inc., Los Angeles, CA (US)

( * ) Notice: Subject to any disclaimer, the term of this patent is extended or adjusted under 35 U.S.C. 154(b) by 579 days.

(21) Appl. No.: 11/300,146

(22) Filed: Dec. 13, 2005

(65) Prior Publication Data
US 2007/0136753 A1 Jun. 14, 2007

(51) Int. Cl.
*G06F 3/00* (2006.01)
(52) U.S. Cl.
USPC .................. 725/46; 725/16; 725/34; 725/35; 725/47
(58) Field of Classification Search
USPC ....................................... 725/35, 9, 116, 134
See application file for complete search history.

(56) References Cited

U.S. PATENT DOCUMENTS

| 4,107,735 | A | 8/1978 | Frohback |
| 4,329,684 | A | 5/1982 | Monteath et al. |
| 4,331,974 | A | 5/1982 | Cogswell et al. |
| 4,488,179 | A | 12/1984 | Kruger |
| 4,536,791 | A | 8/1985 | Campbell et al. |
| 4,694,490 | A | 9/1987 | Harvey et al. |
| 4,866,258 | A | 9/1989 | Ueda et al. |
| 4,977,455 | A | 12/1990 | Young |
| 4,996,642 | A | 2/1991 | Hey |
| 5,099,319 | A | 3/1992 | Esch et al. |
| 5,151,789 | A | 9/1992 | Young |
| 5,155,591 | A | 10/1992 | Wachob |
| 5,212,553 | A | 5/1993 | Maruoka |
| 5,223,924 | A | 6/1993 | Strubbe |
| 5,227,874 | A | 7/1993 | Von Kohorn |
| 5,253,066 | A | 10/1993 | Vogel |
| 5,335,277 | A | 8/1994 | Harvey et al. |
| 5,351,075 | A | 9/1994 | Herz et al. |
| 5,353,121 | A | 10/1994 | Young et al. |
| 5,357,276 | A | 10/1994 | Banker et al. |

(Continued)

FOREIGN PATENT DOCUMENTS

| AR | 032857 B2 | 5/2008 |
| AU | 748164 | 10/2002 |

(Continued)

OTHER PUBLICATIONS

*Cue Readers*, Digital: Convergence Corporation, at http://www.crq.com/master_templ.cfm?view=products&products=cuereader (printed Sep. 24, 2001).

(Continued)

*Primary Examiner* — Cai Chen
(74) *Attorney, Agent, or Firm* — Ropes & Gray LLP

(57) ABSTRACT

Systems and methods for determining cross-platform predictive popularity ratings information are provided. An interactive television application operating on at least one predetermined platform, such as an online interactive application platform, may monitor user interactions with the interactive television application to obtain cross-platform data, which may be used to determine predictive popularity ratings information. The predictive popularity ratings information may then be distributed for use in at least one platform of a type different than the type of the predetermined platform, such as a user television equipment platform.

23 Claims, 14 Drawing Sheets

(56) References Cited

U.S. PATENT DOCUMENTS

| | | | |
|---|---|---|---|
| 5,374,951 A | 12/1994 | Welsh | |
| 5,382,970 A | 1/1995 | Kiefl | |
| 5,410,344 A | 4/1995 | Graves et al. | |
| 5,446,919 A | 8/1995 | Wilkins | |
| 5,452,012 A | 9/1995 | Saitoh | |
| 5,468,948 A | 11/1995 | Koenck et al. | |
| 5,483,278 A | 1/1996 | Strubbe et al. | |
| 5,485,197 A | 1/1996 | Hoarty | |
| 5,488,409 A | 1/1996 | Yuen et al. | |
| 5,502,504 A | 3/1996 | Marshall et al. | |
| 5,515,098 A | 5/1996 | Carles | |
| 5,526,257 A | 6/1996 | Lerner | |
| 5,534,911 A | 7/1996 | Levitan | |
| 5,539,822 A | 7/1996 | Lett | |
| 5,548,345 A | 8/1996 | Brian | |
| 5,557,721 A | 9/1996 | Fite et al. | |
| 5,559,548 A | 9/1996 | Davis et al. | |
| 5,559,549 A | 9/1996 | Hendricks et al. | |
| 5,559,550 A | 9/1996 | Mankovitz | |
| 5,572,442 A | 11/1996 | Schulhof et al. | |
| 5,574,962 A | 11/1996 | Fardeau et al. | |
| 5,583,560 A | 12/1996 | Florin et al. | |
| 5,585,838 A | 12/1996 | Lawler et al. | |
| 5,585,866 A | 12/1996 | Miller et al. | |
| 5,589,892 A | 12/1996 | Knee et al. | |
| 5,592,551 A | 1/1997 | Lett et al. | |
| 5,594,509 A | 1/1997 | Florin et al. | |
| 5,600,364 A | 2/1997 | Hendricks et al. | |
| 5,600,365 A | 2/1997 | Kondo et al. | |
| 5,600,573 A | 2/1997 | Hendricks et al. | |
| 5,608,448 A | 3/1997 | Smoral et al. | |
| 5,610,653 A | 3/1997 | Abecassis | |
| 5,621,456 A | 4/1997 | Florin et al. | |
| 5,623,613 A | 4/1997 | Rowe et al. | |
| 5,629,733 A | 5/1997 | Youman et al. | |
| 5,635,978 A | 6/1997 | Alten et al. | |
| 5,635,979 A | 6/1997 | Kostreski et al. | |
| 5,636,346 A | 6/1997 | Saxe | |
| 5,640,002 A | 6/1997 | Ruppert et al. | |
| 5,657,072 A | 8/1997 | Aristides et al. | |
| 5,657,091 A | 8/1997 | Bertram | |
| 5,659,350 A | 8/1997 | Hendricks et al. | |
| 5,663,757 A | 9/1997 | Morales | |
| 5,666,293 A | 9/1997 | Metz | |
| 5,666,645 A | 9/1997 | Thomas et al. | |
| 5,677,708 A | 10/1997 | Matthews, III et al. | |
| 5,682,195 A | 10/1997 | Hendricks et al. | |
| 5,686,954 A | 11/1997 | Yoshinobu et al. | |
| 5,687,331 A | 11/1997 | Volk et al. | |
| 5,724,521 A | 3/1998 | Dedrick | |
| 5,734,853 A | 3/1998 | Hendricks et al. | |
| 5,740,549 A | 4/1998 | Reilly et al. | |
| 5,749,043 A | 5/1998 | Worthy | |
| 5,754,939 A | 5/1998 | Herz et al. | |
| 5,758,257 A | 5/1998 | Herz et al. | |
| 5,760,821 A | 6/1998 | Ellis et al. | |
| 5,774,170 A | 6/1998 | Hite et al. | |
| 5,781,246 A | 7/1998 | Alten et al. | |
| 5,790,426 A | 8/1998 | Robinson | |
| 5,790,835 A | 8/1998 | Case et al. | |
| 5,790,935 A * | 8/1998 | Payton | 725/91 |
| 5,793,409 A | 8/1998 | Tetsumura | |
| 5,796,952 A | 8/1998 | Davis et al. | |
| 5,798,785 A * | 8/1998 | Hendricks et al. | 725/46 |
| 5,801,747 A | 9/1998 | Bedard | |
| 5,801,785 A | 9/1998 | Crump et al. | |
| 5,805,154 A | 9/1998 | Brown | |
| 5,808,694 A | 9/1998 | Usui et al. | |
| 5,819,156 A | 10/1998 | Belmont | |
| 5,822,123 A | 10/1998 | Davis et al. | |
| 5,828,420 A | 10/1998 | Marshall et al. | |
| 5,828,839 A | 10/1998 | Moncreiff | |
| 5,830,068 A | 11/1998 | Brenner et al. | |
| 5,838,314 A | 11/1998 | Neel et al. | |
| 5,842,010 A | 11/1998 | Jain et al. | |
| 5,842,199 A | 11/1998 | Miller et al. | |
| 5,844,620 A | 12/1998 | Coleman et al. | |
| 5,848,396 A | 12/1998 | Gerace | |
| 5,850,218 A | 12/1998 | Lajoie et al. | |
| 5,867,226 A * | 2/1999 | Wehmeyer et al. | 725/46 |
| 5,870,543 A | 2/1999 | Ronning | |
| 5,872,588 A | 2/1999 | Aras et al. | |
| 5,880,768 A | 3/1999 | Lemmons et al. | |
| 5,886,691 A | 3/1999 | Furuya et al. | |
| 5,886,731 A | 3/1999 | Ebisawa | |
| 5,900,905 A | 5/1999 | Shoff et al. | |
| 5,907,323 A | 5/1999 | Lawler et al. | |
| 5,918,014 A | 6/1999 | Robinson | |
| 5,920,700 A * | 7/1999 | Gordon et al. | 709/226 |
| 5,939,695 A | 8/1999 | Nelson | |
| 5,940,073 A | 8/1999 | Klosterman et al. | |
| 5,945,988 A | 8/1999 | Williams et al. | |
| 5,951,642 A | 9/1999 | Onoe et al. | |
| 5,953,005 A | 9/1999 | Liu | |
| 5,956,716 A | 9/1999 | Kenner et al. | |
| 5,969,748 A | 10/1999 | Casement et al. | |
| 5,974,222 A | 10/1999 | Yuen et al. | |
| 5,977,964 A | 11/1999 | Williams et al. | |
| 5,990,927 A | 11/1999 | Hendricks et al. | |
| 5,991,735 A | 11/1999 | Gerace | |
| 5,999,698 A | 12/1999 | Nakai et al. | |
| 6,002,393 A | 12/1999 | Hite et al. | |
| 6,002,394 A | 12/1999 | Schein et al. | |
| 6,005,597 A | 12/1999 | Barrett et al. | |
| 6,006,257 A | 12/1999 | Slezak | |
| 6,008,836 A | 12/1999 | Bruck | |
| 6,014,502 A | 1/2000 | Moraes | |
| 6,018,372 A | 1/2000 | Etheredge | |
| 6,020,929 A | 2/2000 | Marshall et al. | |
| 6,025,837 A | 2/2000 | Matthews, III et al. | |
| 6,025,886 A | 2/2000 | Koda | |
| 6,029,045 A | 2/2000 | Picco et al. | |
| 6,029,176 A | 2/2000 | Cannon | |
| 6,029,195 A | 2/2000 | Herz | |
| 6,047,317 A | 4/2000 | Bisdikian et al. | |
| 6,052,145 A | 4/2000 | Macrae et al. | |
| 6,061,082 A | 5/2000 | Park | |
| 6,061,097 A | 5/2000 | Satterfield | |
| 6,064,376 A | 5/2000 | Berezowski et al. | |
| 6,064,980 A | 5/2000 | Jacobi et al. | |
| 6,078,348 A | 6/2000 | Klosterman et al. | |
| 6,081,830 A | 6/2000 | Schindler | |
| 6,097,441 A | 8/2000 | Allport | |
| 6,111,614 A | 8/2000 | Mugura et al. | |
| 6,112,186 A | 8/2000 | Bergh et al. | |
| 6,115,057 A | 9/2000 | Kwoh et al. | |
| 6,118,492 A | 9/2000 | Milnes et al. | |
| 6,119,098 A | 9/2000 | Guyot et al. | |
| 6,119,101 A | 9/2000 | Peckover | |
| 6,122,011 A | 9/2000 | Dias | |
| 6,133,909 A | 10/2000 | Schein et al. | |
| 6,137,950 A | 10/2000 | Yuen | |
| 6,144,702 A | 11/2000 | Yurt et al. | |
| 6,151,059 A | 11/2000 | Schein et al. | |
| 6,157,413 A | 12/2000 | Hanafee et al. | |
| 6,160,570 A | 12/2000 | Sitnik | |
| 6,163,316 A | 12/2000 | Killian | |
| 6,172,677 B1 | 1/2001 | Stautner et al. | |
| 6,177,931 B1 | 1/2001 | Alexander et al. | |
| 6,178,446 B1 | 1/2001 | Gerszberg et al. | |
| 6,181,335 B1 | 1/2001 | Hendricks et al. | |
| 6,186,287 B1 | 2/2001 | Heidenreich et al. | |
| 6,201,536 B1 | 3/2001 | Hendricks et al. | |
| 6,202,062 B1 | 3/2001 | Cameron et al. | |
| 6,240,555 B1 | 5/2001 | Shoff et al. | |
| 6,256,785 B1 | 7/2001 | Klappert et al. | |
| 6,262,721 B1 | 7/2001 | Tsukidate et al. | |
| 6,263,501 B1 | 7/2001 | Schein et al. | |
| 6,263,507 B1 | 7/2001 | Ahmad et al. | |
| 6,279,157 B1 | 8/2001 | Takasu | |
| 6,286,005 B1 | 9/2001 | Cannon | |
| 6,286,140 B1 | 9/2001 | Ivanyi | |
| 6,298,482 B1 | 10/2001 | Seidman et al. | |
| 6,312,336 B1 | 11/2001 | Handelman et al. | |

(56) References Cited

U.S. PATENT DOCUMENTS

| | | |
|---|---|---|
| 6,317,881 B1 | 11/2001 | Shah-Nazaroff et al. |
| 6,321,991 B1 | 11/2001 | Knowles |
| 6,323,911 B1 | 11/2001 | Schein et al. |
| 6,330,586 B1 | 12/2001 | Yates et al. |
| 6,331,877 B1 | 12/2001 | Bennington et al. |
| 6,343,311 B1 | 1/2002 | Nishida et al. |
| 6,353,929 B1 | 3/2002 | Houston |
| 6,359,661 B1 | 3/2002 | Nickum |
| 6,363,525 B1 | 3/2002 | Dougherty et al. |
| 6,366,890 B1 | 4/2002 | Usrey |
| 6,388,714 B1 | 5/2002 | Schein et al. |
| 6,389,593 B1 | 5/2002 | Yamagishi |
| 6,392,710 B1 | 5/2002 | Gonsalves et al. |
| 6,405,370 B1 | 6/2002 | Jarrell |
| 6,405,926 B1 | 6/2002 | Yomogida et al. |
| 6,408,437 B1 | 6/2002 | Hendricks et al. |
| 6,412,110 B1 | 6/2002 | Schein et al. |
| 6,418,556 B1 | 7/2002 | Bennington et al. |
| 6,445,306 B1 | 9/2002 | Trovato et al. |
| 6,453,471 B1 | 9/2002 | Klosterman |
| 6,463,585 B1 * | 10/2002 | Hendricks et al. ............... 725/35 |
| 6,469,753 B1 | 10/2002 | Klosterman et al. |
| 6,470,497 B1 | 10/2002 | Ellis et al. |
| 6,477,705 B1 | 11/2002 | Yuen et al. |
| 6,502,241 B1 | 12/2002 | Kretz et al. |
| 6,515,680 B1 | 2/2003 | Hendricks et al. |
| 6,516,323 B1 | 2/2003 | Kamba |
| 6,530,082 B1 | 3/2003 | Del Sesto et al. |
| 6,539,548 B1 | 3/2003 | Hendricks et al. |
| 6,545,722 B1 | 4/2003 | Schultheiss et al. |
| 6,564,378 B1 | 5/2003 | Satterfield et al. |
| 6,587,127 B1 | 7/2003 | Leeke et al. |
| 6,622,306 B1 | 9/2003 | Kamada |
| 6,637,029 B1 | 10/2003 | Maissel et al. |
| 6,698,020 B1 | 2/2004 | Zigmond et al. |
| 6,704,931 B1 * | 3/2004 | Schaffer et al. ................. 725/46 |
| 6,738,978 B1 * | 5/2004 | Hendricks et al. ............... 725/35 |
| 6,750,881 B1 | 6/2004 | Appelman |
| 6,750,885 B1 | 6/2004 | Finch, II et al. |
| 6,757,691 B1 | 6/2004 | Welsh et al. |
| 6,766,956 B1 | 7/2004 | Boylan, III et al. |
| 6,792,618 B1 | 9/2004 | Bendinelli et al. |
| 6,983,478 B1 | 1/2006 | Grauch et al. |
| 6,999,698 B2 | 2/2006 | Yamauchi |
| 7,003,792 B1 | 2/2006 | Yuen |
| 7,047,550 B1 | 5/2006 | Yasukawa et al. |
| 7,117,518 B1 | 10/2006 | Takahashi et al. |
| 7,188,356 B1 | 3/2007 | Miura et al. |
| 7,200,852 B1 | 4/2007 | Block |
| 7,343,614 B1 | 3/2008 | Hendricks et al. |
| 7,356,547 B2 | 4/2008 | Ozer et al. |
| 7,478,414 B1 * | 1/2009 | Glusker et al. .................... 725/9 |
| 7,813,822 B1 | 10/2010 | Hoffberg |
| 2001/0021994 A1 * | 9/2001 | Nash .............................. 725/42 |
| 2002/0010930 A1 | 1/2002 | Shah-Nazaroff et al. |
| 2002/0056087 A1 * | 5/2002 | Berezowski et al. ............. 725/9 |
| 2002/0059602 A1 | 5/2002 | Macrae et al. |
| 2002/0095676 A1 | 7/2002 | Knee et al. |
| 2002/0112239 A1 * | 8/2002 | Goldman ....................... 725/46 |
| 2003/0010454 A1 | 1/2003 | Bailey, III et al. |
| 2003/0110171 A1 | 6/2003 | Ozer et al. |
| 2003/0131355 A1 | 7/2003 | Berenson et al. |
| 2003/0146940 A1 * | 8/2003 | Ellis et al. ..................... 345/811 |
| 2004/0003397 A1 | 1/2004 | Boston et al. |
| 2004/0022278 A1 | 2/2004 | Thomas et al. |
| 2004/0049788 A1 | 3/2004 | Mori et al. |
| 2004/0194138 A1 | 9/2004 | Boylan, III et al. |
| 2004/0243470 A1 | 12/2004 | Ozer et al. |
| 2005/0020439 A1 | 1/2005 | Ishii et al. |
| 2005/0025318 A1 | 2/2005 | Sadaie et al. |
| 2005/0076363 A1 | 4/2005 | Dukes et al. |
| 2005/0149964 A1 | 7/2005 | Thomas et al. |
| 2005/0235318 A1 | 10/2005 | Grauch et al. |
| 2005/0251824 A1 | 11/2005 | Thomas et al. |
| 2005/0278741 A1 | 12/2005 | Robarts et al. |
| 2006/0031916 A1 | 2/2006 | Colter et al. |
| 2006/0174277 A1 * | 8/2006 | Sezan et al. ..................... 725/46 |
| 2006/0190966 A1 | 8/2006 | McKissick et al. |
| 2006/0248558 A1 | 11/2006 | Barton et al. |
| 2007/0113244 A1 * | 5/2007 | Verschueren et al. ........... 725/35 |
| 2008/0109284 A1 | 5/2008 | Slaney et al. |
| 2008/0196053 A1 | 8/2008 | Thomas et al. |
| 2008/0276275 A1 | 11/2008 | Ellis |
| 2010/0122282 A1 | 5/2010 | DuBose |
| 2010/0175081 A1 | 7/2010 | Boylan, III et al. |
| 2010/0192172 A1 | 7/2010 | Thomas et al. |
| 2011/0078628 A1 | 3/2011 | Rosenberg |

FOREIGN PATENT DOCUMENTS

| | | |
|---|---|---|
| CA | 2285645 | 7/1998 |
| CA | 2454011 | 9/2008 |
| CN | 1494321 A | 5/2004 |
| CN | 99805508 | 1/2005 |
| EP | 0 424 648 | 5/1991 |
| EP | 0711076 A2 | 5/1996 |
| EP | 0 753 964 | 1/1997 |
| EP | 0 772 360 | 5/1997 |
| EP | 0 784 405 | 7/1997 |
| EP | 0 822 718 | 2/1998 |
| EP | 0 849 948 | 6/1998 |
| EP | 0 851 681 | 7/1998 |
| EP | 1060617 | 5/2004 |
| EP | 1217832 | 6/2004 |
| EP | 1961228 | 3/2011 |
| JP | 59-141878 | 8/1984 |
| JP | 61-050470 | 3/1986 |
| JP | 10-93933 A | 4/1989 |
| JP | 1177782 A | 7/1989 |
| JP | 0479053 | 3/1992 |
| JP | 06-124309 | 5/1994 |
| JP | 7 23356 | 4/1995 |
| JP | 8331546 | 12/1996 |
| JP | 9-261609 | 10/1997 |
| JP | 10-013774 A | 1/1998 |
| JP | 4443042 | 1/2010 |
| JP | 201057201 | 3/2010 |
| WO | WO 94/14281 | 6/1994 |
| WO | WO 94/14284 | 6/1994 |
| WO | WO 94/23383 | 10/1994 |
| WO | WO 95/07003 | 3/1995 |
| WO | WO-9515658 A1 | 6/1995 |
| WO | WO 95/32585 | 11/1995 |
| WO | WO 96/08109 | 3/1996 |
| WO | WO 96/08113 | 3/1996 |
| WO | WO 96/09721 | 3/1996 |
| WO | WO 96/26605 | 8/1996 |
| WO | WO 96/34491 | 10/1996 |
| WO | WO 96/41471 | 12/1996 |
| WO | WO 96/41478 | 12/1996 |
| WO | WO 97/07656 | 3/1997 |
| WO | WO 97/12486 | 4/1997 |
| WO | WO 97/13368 | 4/1997 |
| WO | WO 97/17774 | 5/1997 |
| WO | WO 97/18675 | 5/1997 |
| WO | WO 97/26612 | 7/1997 |
| WO | WO 97/31480 | 8/1997 |
| WO | WO 97/41673 | 11/1997 |
| WO | WO 97/42763 | 11/1997 |
| WO | WO 97/48230 | 12/1997 |
| WO | WO 97/49237 | 12/1997 |
| WO | WO 97/49242 | 12/1997 |
| WO | WO 98/06219 | 2/1998 |
| WO | WO 98/17064 | 4/1998 |
| WO | WO 98/27723 | 6/1998 |
| WO | WO-9826584 | 6/1998 |
| WO | WO 98/28906 | 7/1998 |
| WO | WO 98/41020 | 9/1998 |
| WO | WO 98/56172 | 12/1998 |
| WO | WO 99/04561 | 1/1999 |
| WO | WO 99/07142 | 2/1999 |
| WO | WO 99/12346 | 3/1999 |
| WO | WO 99/29109 | 6/1999 |
| WO | WO 99/45700 | 9/1999 |

(56) References Cited

FOREIGN PATENT DOCUMENTS

| WO | WO 99/45702 | 9/1999 |
|---|---|---|
| WO | WO 99/52285 | 10/1999 |
| WO | WO 99/60789 | 11/1999 |
| WO | WO-9960790 | 11/1999 |
| WO | WO 99/66725 | 12/1999 |
| WO | WO-9966726 | 12/1999 |
| WO | WO 00/04706 | 1/2000 |
| WO | WO 00/04709 | 1/2000 |
| WO | WO 00/16548 | 3/2000 |
| WO | WO 00/27122 | 5/2000 |
| WO | WO 00/28734 | 5/2000 |
| WO | WO-0027124 | 5/2000 |
| WO | WO 00/33160 | 6/2000 |
| WO | WO 00/33224 | 6/2000 |
| WO | WO 00/49801 | 8/2000 |
| WO | WO 00/78050 | 12/2000 |
| WO | WO-0101308 | 1/2001 |
| WO | WO-0101308 A2 | 1/2001 |
| WO | WO-0176248 | 10/2001 |
| WO | WO 01/89213 | 11/2001 |
| WO | WO-0225938 | 3/2002 |
| WO | WO-0225938 A2 | 3/2002 |
| WO | WO 02/31731 | 4/2002 |
| WO | WO 03036970 | 5/2003 |
| WO | WO-03/051051 A1 | 6/2003 |
| WO | WO-03051051 | 6/2003 |
| WO | WO-2007070422 | 6/2007 |

OTHER PUBLICATIONS

*GoCode*, The Code Corporate, at http://www.gocode.com/products/reader.htm (printed Sep. 24, 2001).

Paperclick, NeoMedia Technologies, Inc., at http://www.paperclick.com/How_works.htm (printed Sep. 24, 2001).

*VIDEO Plus+*, Gemstar Development Limited, at http://www.gemstar.co.uk/en/videoplus/intromain.html (printed Sep. 24, 2001).

Office Action and Corresponding Replies in relation to U.S. Appl. No. 10/953,487.

Office Action and Corresponding Replies in relation to U.S. Appl. No. 11/182,690.

Office Action and Corresponding Replies in relation to U.S. Appl. No. 11/894,691.

Office Action and Corresponding Replies in relation to U.S. Appl. No. 09/878,050.

Grounds, facts and Evidence in Support of Opposition to EP1961228 (Dec. 19, 2011; 22 pages).

"Television Viewing Habits of Three IQ Groups of Urban Middle School Students", KUNST, University of Pittsburgh, 1986, pp. 2-219 (54 pages).

Counterlcaim in European Patent Opposition No. 1961228 (EP Application No. 06845102.0) dated Aug. 2, 2012.

U.S. Appl. No. 60/120,722, filed Feb. 17, 1999, Hancock et al.

\* cited by examiner

CROSS-PLATFORM PREDICTIVE POPULARITY RATINGS FOR USE IN INTERACTIVE TELEVISION APPLICATIONS

BACKGROUND OF THE INVENTION

This invention relates to interactive television applications, and more particularly to cross-platform predictive popularity ratings for use in interactive television applications.

An interactive television application may be configured to provide a number of interactive features, such as television program listings, pay-per-view services, video-on-demand services, web browsing services, games, home shopping, and other interactive features, to the user. Within the interactive television application, an interactive television program guide may allow users to view screens of program listings, browse or search for programs or content, and receive information related to the programs or content.

Interactive television applications may be implemented in many different types of platforms. As defined herein, a platform refers to any system that can support the operation of an interactive television application. Typical examples of platforms include, for example, television equipment (e.g., set-top boxes, digital video recorders, televisions, etc.), personal computers (e.g., desktop computers, notebook computers), mobile phones, personal digital assistants (PDA), BlackBerrys™, and various other electronic devices. Some of these platforms support the operation of online interactive applications over an Internet communications link, a public network, a global communications network, or any other suitable networks or links for accessing online interactive application data and content (e.g., using interactive television web pages). These platforms may be collectively referred to as online interactive application platforms. Some platforms may provide the functionality of multiple platforms within a single device. For example, a hybrid device (e.g., a web-tv device) may function as a television equipment platform and an online interactive application platform. As defined herein, individual systems that provide hybrid or multi-platform functionality may be considered as having multiple platforms within one system.

Given the wide disparity in platforms, it is understood that each platform may provide different advantages and disadvantages, largely dependent on design factors such as the interactive application to be used, the hardware design, the software design, and the features provided by each platform. Exemplary interactive applications that may be provided by various platforms include a set-top box based application, an online guide, etc. The hardware design may include factors, such as size, portability, processing power, connectivity, bandwidth, memory, storage capacity, and interface (e.g., type of display screen, type of input device, etc.). The features provided may include audio content, video content, online content, etc. These design factors, taken together, characterize each of the various platforms and influence the nature of their use.

Some platforms (e.g., user television platforms) may be able to support many different or more advanced interactive television application features than other platforms (e.g., mobile phone platforms). However, the other platforms may offer advantages such as convenience even though such platforms may or may not provide as many interactive features. For example, users may find it more convenient to access an interactive television guide using a work computer (e.g., a particular platform) or a PDA (e.g., another platform), rather than use the platform they have at home.

When a user accesses information in an interactive television application, the user may access "actual" popularity ratings information for programs or content listed on a display screen of the user platform. The "actual" popularity ratings information may be determined and distributed to the user platform by an audience measurement system. The audience measurement system may receive "actual" audience measurement data and generate the "actual" popularity ratings information based on that data. The "actual" audience measurement data is limited in that it represents audience sizes for programs based on the number of platforms receiving or actually recording those programs. In addition, the audience measurement systems are limited in that the audience measurement data is typically obtained from interactive applications operating on a particular platform (e.g., a user television platform) and the "actual" popularity ratings information is distributed to interactive applications operating on that same particular platform (e.g., the user television platform).

In some situations, a user may desire to know how popular a particular television program or content is likely to be, thereby potentially influencing the user's decision whether to view the program or content. Known systems, as discussed above, are limited to informing users of the popularity of a program or content during or after the broadcast of the program or content. Moreover, even when the "actual" popularity ratings are provided, such ratings are limited to user monitored interactions with interactive television applications operating on just one type of platform, which may be the same type of platform to which the "actual" popularity ratings are distributed. This approach is too constrictive, especially considering the variety of different types of platforms that provide users with many choices in the particular platform or platforms they wish to use. Accordingly, it would be desirable to obtain a cross-section of user interactions with interactive television applications across platforms to obtain larger data samples, which may, for example, assist in more accurately predicting popularity ratings for various programs and television content.

SUMMARY OF THE INVENTION

In accordance with the principles of the present invention, systems and methods for an interactive television application are provided for monitoring user interactions with interactive television applications operating on at least one predetermined platform to obtain cross-platform data, which may be used to determine predictive popularity ratings information. The predictive popularity ratings information is distributed for use in interactive television applications operating in at least one platform of a type different than the type of the predetermined platform. As defined herein, cross-platform data refers to data obtained from a platform of a type different from the type of platform that uses the data, or a manipulated version thereof (e.g., predictive popularity ratings information). Cross-platform data includes monitored user interaction data obtained to determine predictive popularity ratings and any other suitable audience measurement data.

Predictive popularity ratings may be determined based on predictions or estimates of the audience size of a particular program. Predictive popularity ratings information may be determined based at least in part on monitoring user interactions with an interactive television application operating in at least one platform. For example, user interest in television programming may be inferred from user interactions with an interactive television program guide, such as selecting a program listing, browsing a program description, searching the program listings, or selecting options associated with a particular program listing. The monitored user interaction cross-platform data may be collected and analyzed to determine predictive popularity ratings information based at least in part on the monitored interactions. The predictive popularity ratings information may then be provided for use (e.g., display) within an interactive television application operating in at least one different type of platform.

All suitable platforms provide certain interactive television application features, such as program listings. In addition, some platforms provide additional features. For example, some platforms (e.g., television equipment platforms) may provide users with access to audio and visual content, whereas other platforms may provide limited or no access to audio and visual content (e.g., online interactive application platforms). The presence of these additional features (or lack thereof) may influence the ways in which these platforms are used. For example, online interactive application platforms may be used to browse programming that will be watched in the future, while television equipment platforms may be used to browse currently broadcast programming.

In some embodiments, an online interactive television application operating on a particular platform (i.e., an online interactive application platform) may provide interactive program listings and may monitor user interactions with program listings. An audience measurement application may collect and analyze the monitored user interaction data in order to determine predictive popularity ratings information. The audience measurement application may then distribute the predictive popularity ratings information and may provide the predictive popularity ratings information for use in an interactive television application operating in a platform of type different than the type in which the online guide is operating, such as television equipment.

In some embodiments, all platforms may be monitored to determine predictive popularity ratings information. In other embodiments, only selected platforms may be monitored. For example, user interactions with an online interactive application platform may be more indicative of user interest in a particular program than user interactions with other platforms.

In some embodiments, the interactions of all users of the interactive television application may be monitored. In other embodiments, only the interactions of select users are monitored. For example, only the interactions of users that register or login to the interactive television application may be monitored.

In some embodiments, multiple criteria may be used to selectively monitor and/or selectively weight the cross-platform data (e.g., user interaction data) to determine the predictive popularity ratings information. These criteria may include, for example, platform type, user type, interaction type, time of interaction, etc. It is understood that any other suitable criteria that may be used to improve the determination of the predictive popularity ratings information may also be used.

In some embodiments, the interactive television application may use additional information, such as historical popularity ratings information and actual audience measurement data in addition to the monitored user interaction data to determine predictive popularity ratings information. Historical popularity ratings information may include popularity ratings information from previous broadcasts of the same or similar programming (e.g., the previous program in a series).

In some embodiments, the predictive popularity ratings information may be segmented according to user demographics, community group, geographic location, equipment platform type, etc. The information used to segment the predictive popularity ratings may be provided by users, associated with user profiles, based on monitoring a user's actions, or may be collected using any other suitable approach.

In some embodiments, the interactive television application may use the predictive popularity ratings information to provide programming recommendations to users. The interactive television application may recommend programs that are associated with good predictive popularity ratings information. In some embodiments, recommendations may be customized to a user based on the user's interests, demographics, community group, geographic location, or platform type.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE PREFERRED EMBODIMENTS

Figure 1:
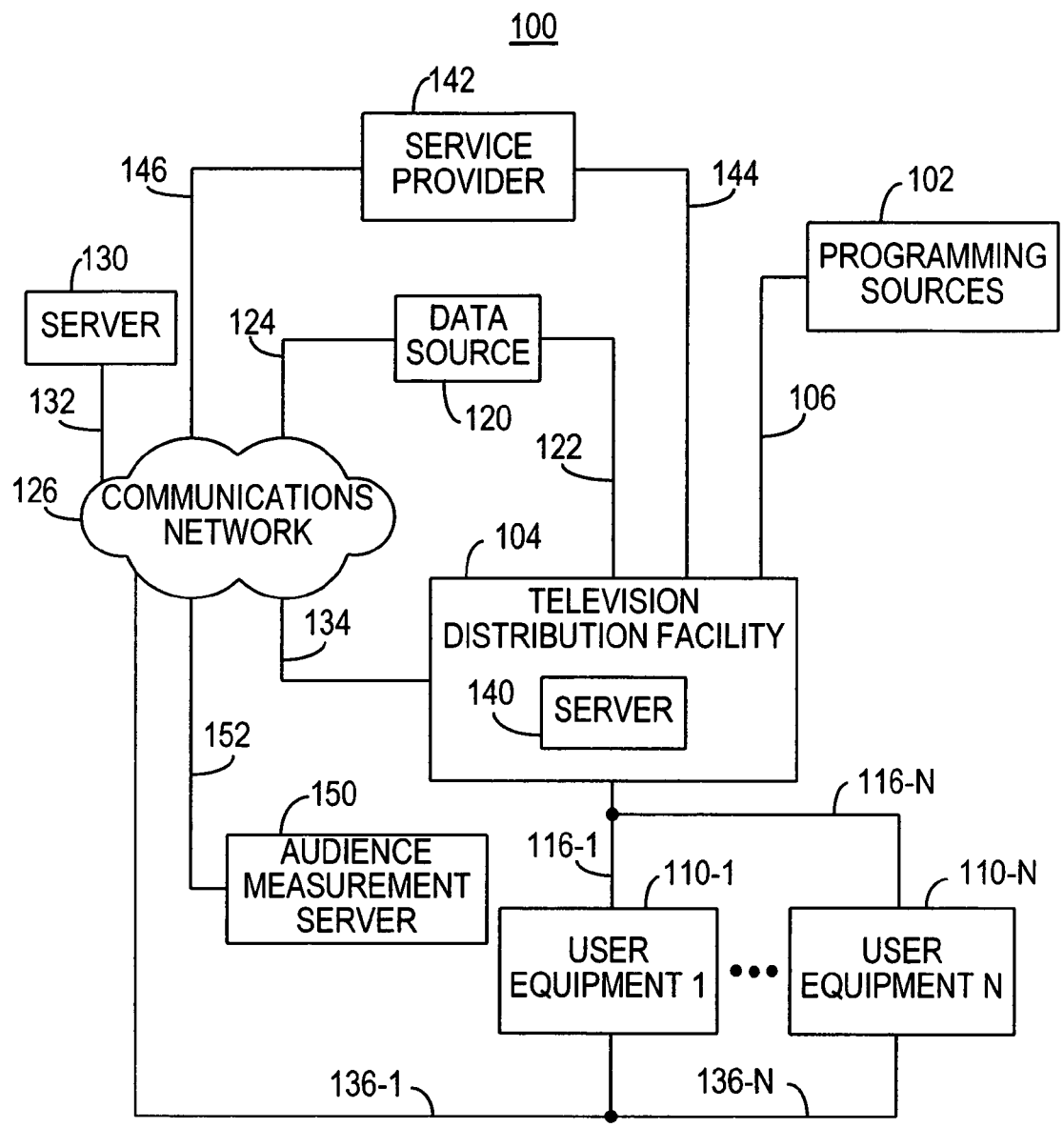
FIG. 1 is a diagram of an illustrative interactive television system in accordance with the present invention.

Illustrative interactive television system 100 in accordance with the present invention is shown in FIG. 1. Content (e.g., video and/or audio content) is provided from programming sources 102 to television distribution facilities, such as television distribution facility 104, using communications path 106. Programming sources 102 may be any suitable sources of television and music content, such as, for example, television broadcasters (e.g., NBC, ABC, and HBO), satellite radio broadcasters (Sirius, XM Satellite radio), Internet content sources, or other video or audio content sources. Audience measurement server 150 may determine and distribute popularity ratings information.

An audience measurement application may operate in conjunction with audience measurement server 150 to measure, collect, process, and distribute data connected to popularity ratings information within interactive television system 100. Audience measurement server 150 is pictured as a separate server, but it is understood that some or all of the functionality of audience measurement server 150 may be implemented by other suitable components of system 100, such as data source 120, server 130, server 140, service provider 142, television distribution facility 104, user equipment 110 and combinations thereof.

The audience measurement application may provide popularity ratings information based on audience measurement data. Interactive television systems that monitor audience measurement data, provide popularity ratings information based on the audience measurement data, and provide real-time popularity ratings information within an interactive television application are described for example in United States Patent Application Publication Nos. 2005/0149964 and 2002/0056087, published Jul. 7, 2005 and May 9, 2002, respectively. These two publications are incorporated herein by reference in their entireties.

The audience measurement application may also provide predictive popularity ratings information. Predictive popularity ratings may be determined based on predictions or estimates of the audience size of a particular program or any other suitable content. In contrast to popularity ratings information that is primarily based on audience measurement data, predictive popularity ratings anticipate, estimate, or otherwise predict the audience information.

Whereas popularity ratings information that is primarily based on audience measurement data is essentially backward-looking (i.e., providing information based on measurements of past or current events), predictive popularity information is forward-looking (i.e., providing information on events that have not yet occurred or for which measurements are not yet complete, available, or accurate). For example, predictive popularity ratings information may be available before the broadcast time of a particular television program, while audience measurement data may not be available until after the broadcast time or even a considerable time after that.

In some embodiments, predictive popularity ratings information may be provided whenever there is not sufficient audience measurement data to provide popularity ratings information that is primarily based on audience measurement data. In some other embodiments, predictive popularity ratings information may be provided notwithstanding the availability of audience measurement data. In fact, in some embodiments, predictive popularity ratings information may be preferable to the popularity ratings information that is primarily based on audience measurement data.

Predictive popularity ratings information may be determined based at least in part on monitoring user interactions with an interactive television application. The interactive television application may monitor any user interactions that indicate user interest in any content or features provided by an interactive television application. For example, user interest in television programming may be inferred from user interactions with an interactive television program guide, such as selecting a program listing, browsing a program description, searching the program listings, or selecting options associated with a particular program listing. Selectable options, for example, may allow a user to request additional information about the selected program, set reminders for the selected program, and set recording options for the selected program. In some embodiments, interactive television applications, such as an online interactive program guide, may provide hypertext links to websites associated with a program. Selecting the hyperlink for the program or connecting to other websites associated with the program may also indicate user interest in that program.

User interest in a particular program may also be inferred from other user interactions, such as browsing a program description for an extended time (e.g., a time duration that exceeds a predetermined period of time) and contributing evaluative ratings to a particular program.

Additional types of user interactions within an interactive television application may also be monitored. For example, selecting advertisements or program promotions relating to a particular program may indicate user interest in the program. Accordingly, any user interactions that may indicate interest in a particular program may be monitored for use in determining predictive popularity ratings.

In addition to monitoring user interactions with an interactive television application, user preferences, profiles, settings, and configuration information may also be monitored and collected to determine predictive ratings information. For example, user recording and reminder settings may be monitored. Information on the number of users that have setup recordings or reminders for upcoming programs may indicate interest in those programs. Recordings and reminders for an entire season of a television series may be an even stronger indication of user interest. Further, the interactive television application may monitor the programs that are to be recorded by the user (e.g., to recording device 216 (FIG. 2)) and may monitor when those recorded programs are eventually erased, saved, or played.

In some embodiments, any platform on which an interactive television application is implemented may be monitored to determine predictive popularity ratings information. In other embodiments, only selected platforms may be monitored. These platforms may be selected because they provide user interaction data that may be particularly indicative of user interest and intention to watch particular programming than user interaction data from other platforms. For example, users may access an online interactive application platform to browse or search through program listings to decide what television programs they will watch at a later time. In this manner, the cross-platform data collected from the online interactive platform application may be indicative of future user actions at a different platform (e.g., a television equipment platform).

Similarly, other platforms that are primarily used to browse or search program listings for future programming may also be selected to be monitored. In some embodiments, these selected platforms may be platforms that provide limited or no access to audio or video content. With limited or no access to view current programming, these platforms may primarily be used to plan upcoming viewing activities. As a result, monitored user interaction data from these selected platforms may be especially useful in determining predictive popularity ratings information.

Cross platform data, such as user interaction data, may be collected by the audience monitoring application in order to determine predictive ratings information. In some embodiments the data is periodically or continually transmitted to audience measurement server 150. In some embodiments, the data is transmitted in response to a request for the information by audience measurement server 150. The collected data may be stored in a database on audience measurement server 150.

After the cross-platform data is monitored and collected, the cross-platform data may be analyzed by the audience measurement application to determine predictive popularity ratings information. The data may be analyzed according to any suitable algorithm. In some embodiments simple algorithms may be used. For example, the number of users that requested information on a particular program may directly correlate to the determined predictive ratings information. As another example, all of the collected user interaction information may be compiled to determine the predictive ratings information.

In some other embodiments, more sophisticated algorithms may be used to analyze the cross-platform. For example, some user interactions may be more indicative of user interest in a particular program than others and may therefore be more significant in determining predictive popularity ratings. Different weights or significance may be assigned to various elements of the collected cross-platform data. Similarly, the cross-platform data may be filtered to include the data that is most significant or exclude the data that is least significant. Any other suitable data analysis technique may be used to determine predictive ratings information from the cross-platform data.

In some embodiments, user interaction data may be weighted based on the type user interactions that are monitored. For example, selecting a program listing to access the program's description may be less significant than setting up a program reminder or recording. As another example, selecting a single program listing at particular time slot may be more significant than selecting two or more program listings for the same time slot.

In some embodiments, user interaction data may be weighted based on the time the monitored interaction takes place. For example, user interactions that take place right before (e.g., a few minutes) the broadcast of a program may be less significant than user interactions that takes place a few hours before the broadcast. As another example, user interactions that take place at a certain time (e.g., the afternoon) may be more significant than user interaction that take place at another time (e.g., at night). In some other embodiments, only user interaction data from a particular timeframe (e.g., a two-hour window) may be used to determine the predictive popularity ratings information.

In some embodiments, user interaction data may be weighted based on the particular interactive television application in which user interactions are monitored. For example, user interactions in a television program guide may be more significant than user interactions in other interactive television applications.

In some embodiments, user interaction data may be weighted based on the type of platform on which user interactions are monitored. For example, user interactions monitored on a online interactive application platform may be more significant then user interactions monitored on user television equipment platform.

In some embodiments, user interaction data may be weighted based on the type of user that is monitored. For example, the interactive television application may only monitor the interactions of users that consent to the monitoring or that register or login to provide user profile information to the interactive television application. As another example, the interactive television application may only monitor the interactions of a select set of users. The set of users may be selected for having certain characteristics or may be selected randomly.

Selecting or filtering the elements of the cross-platform data to be included in the analysis and assigning weights to the cross-platform data may occur at any stage in providing the predictive popularity ratings. The selecting, for example, may occur during the monitoring, collecting, or analyzing of the data. For example, instead of assigning low weights to user interaction data collected from a particular platform, the user interaction data may not be collected from or monitored by those platforms. In this manner, the audience measurement application may be configured to maximize or minimize the amount of data that is analyzed.

The analysis of the cross-platform data to determine predictive popularity ratings may be configured to maximize the accuracy of the predicted ratings. In some embodiments, the predictive popularity ratings information may be compared with popularity ratings information based on audience measurement data when the audience measurement data becomes available. Evaluating the level of accuracy achieved by predictive popularity ratings may help improve the algorithms used to determine the predictive popularity ratings information. In some embodiments the algorithms may be modified manually, while in other embodiments learning algorithms may be automatically modified based on the accuracy of the predictive popularity ratings. Further, in some embodiments multiple algorithms may be used to determine the predictive popularity ratings. For example, one algorithm may be used to determine predictive popularity ratings for primetime television, another algorithm may be used for daytime television, and yet another algorithm may be used for pay-per-view movies.

In some embodiments, audience measurement data may be used in addition to the user interaction data to determination predictive popularity ratings. For example, the audience measurement application may store and maintain a database of historical popularity ratings and audience measurement information. The historical popularity ratings and audience measurement information may be used in conjunction with or in place of the user interaction data. For example, in some embodiments, historical popularity ratings and audience measurement information may be used to determine the baseline popularity ratings for a television series and the user interactions data may be used to determine whether the predicted popularity ratings will be higher or lower than that baseline. As another example, predictive popularity ratings information for a future repeat broadcast of a program may be determined at least partially based on historical popularity ratings and audience measurement information from the original broadcast.

In addition to determining predictive popularity ratings information, the audience measurement application may segment the predictive popularity ratings information to allow further analysis of the predictive popularity ratings information. For example, the predictive popularity ratings information may be segmented according to user demographics. User demographic may include, for example, age, gender, race, sexual orientation, family size, family life cycle, income, occupation, education, home ownership, socioeconomic status, religion, interests, etc. Predictive popularity ratings information may also be segmented according to the geographic location of the users. Users geographic segments may include, for example, by country, state, metropolitan region, city, zip code, television market, or any other suitable geographic descriptions. Predictive popularity rating segments may also include, for example, user platform type, interaction television application type, type of user interactions monitored, time at which a user interaction is monitored, etc.

The information used to segment the predictive popularity ratings may be provided by users, associated with user profiles, based on monitoring a user's actions, or may be collected using any other suitable approach.

Predictive popularity ratings information may also be segmented according to the community group of the users. User community groups may be groups of users that share common interests, preferences, and behaviors. Community groups may also be defined based on demographic and geographic factor. Users may manually join one or more community groups based on their connection with the group. Alternatively, users may be automatically assigned to community groups based on user profile information or based on monitoring a user's actions. In some embodiments, the interactive television application may suggest a community group to a user based on the users profile or action and the user may decided whether or not to join.

After determining predictive popularity ratings the audience measurement application may distribute the predictive popularity ratings information. The predictive popularity ratings information may be distributed throughout interactive television system 100. For example, the predictive popularity ratings information may be provided to server 130, service provider 142, television distribution facility 104, data source 120, programming source 102, user equipment 110, or any other suitable component of system 100 or component connected to communications network 126.

Predictive audience ratings information may be distributed to users, advertisers, television executives, any suitable person, or legal entity (e.g., corporation, limited liability company, a partnership, etc.) interested in the predicted or estimated popularity of programming. In some embodiments, the predicted popularity ratings information or some aspects of the predicted popularity ratings information may remain private and may only be provided to authorized parties.

In some embodiments, the predicted popularity ratings information may be distributed to all interactive television applications operating on different types of platforms. It this embodiment, cross-platform data (e.g., user interaction data) may be collected from at least one platform of type different from the type of at least one platform receiving the predicted popularity ratings information.

In other embodiments, the predicted popularity ratings information may only be distributed to interactive television applications operating on one or more selected platforms (e.g., user television equipment platforms). These selected platforms may be different than the platforms monitored to collect cross-platform data. For example, platforms that provide limited or no access to audio or video content may provide more useful user interaction data and may be better suited for being selected for monitoring purposes. However, platforms that provide more comprehensive access to audio or video content may be better suited for displaying predictive popularity information.

Returning to FIG. 1, program schedule data and other data is provided from data source 120 to television distribution facilities (e.g., television distribution facility 104) using communications path 122. Data source 120 may include a program listings database having television program schedule information to be provided to an interactive television application implemented on user equipment 110. The television program schedule information may include scheduled broadcast times, titles, channels, ratings information (e.g., popularity ratings, evaluative ratings, and suitability-to-audience ratings), detailed title descriptions, genre or category information (e.g., sports, news, movies, etc.), and information on actors and actresses. Data source 120 may also be used to provide advertisements (e.g., program guide advertisements and advertisements for other interactive television applications), real-time data such as sports scores, stock quotes, news data, weather data, application data for one or more interactive television applications, and any other suitable data for use by system 100.

In some embodiments, there may be multiple data sources, such as data source 120 in system 100. For example, system 100 may include a data source associated with broadcast programming (e.g., advertisements, logo data for each broadcaster), a data source associated with pay-per-view (PPV) programming, a data source associated with on-demand programming (e.g., video-on-demand (VOD) programming), and/or a data source associated with popularity ratings information (e.g., predictive popularity ratings information).

In some embodiments, data source 120 provides program schedule data and other data directly to user equipment 110 by way of path 124, communications network 126, and path 136 instead of providing the program schedule data to user equipment 110 via television distribution facility 104. Communications network 126 may be any suitable communications network, such as the Internet, a public switched telephone network, a packet-based network, a global communications network, or the world wide web.

Television distribution facility 104 may be a cable system headend, a satellite television distribution facility, a television broadcaster, or any other suitable facility for distributing television and/or other video or audio programming to users. Television distribution facility 104 may provide user equipment 110 with content received from programming sources 102 and program schedule data and other interactive television data received from data source 120 over communications path 116 using any suitable approach. For example, content may be provided to user equipment 110 in a broadcast, multicast, or unicast. Program schedule data and other data may be provided to user equipment 110 on a television channel sideband, in the vertical blanking interval of a television channel, using an in-band or out-of-band digital signal, or by any other suitable data transmission technique. Television distribution facility 104 may provide user equipment 110 with content, program schedule data, and other data on multiple analog or digital television channels, and with any suitable frequency (e.g., continuously, daily, in response to a request from user equipment, etc.).

Television distribution facility 104 is connected to one or more user equipment 110-$i$ using communications path 116-I (where i=1, . . . , N). Generally, user equipment 110-$i$ generically represents any platform that may support operation of an interactive television application in accordance with the invention. User equipment 110 may be located, for example, in a user's home, in user's vehicles, in the user's offices, as part of the user's portable devices, or in any other suitable location. In some embodiments, user equipment 110 may not belong to the user (e.g., a public terminal).

User equipment 110 may be any suitable user device for accessing video content, audio content or interactive television application features. In some embodiments, user equipment 110 may be configured to display web pages of an online interactive television application and/or multimedia content. For example, user equipment 110 may be a portable device platform such as a mobile phone, personal digital assistant (PDA), BlackBerry™, portable television, laptop computer, I-Video device, portable media player, or any other suitable portable device platform. Other suitable types of user equipment 110 may include local user devices such as, for example, a user's home television equipment, DVR device, set-top box, home personal computer, or any other suitable local device platform. In some embodiments, user equipment 110 may be a non-local user device platform (e.g., a public or remote computer).

An interactive television application implemented on user equipment 110, television distribution facility 104, or another device of system 100 may use the program schedule data and other interactive television data to display program listings and other information (e.g., information on digital music) for the user. Interactive television application displays may be generated and displayed for the user using any suitable approach. For example, an interactive television application implemented at least in part on television distribution facility 104 may generate and transmit application display screens to user equipment 110 for display. As another example, user equipment 110 may store data for use in one or more interactive television displays (e.g., program schedule data, advertisements, logos, etc.), and an interactive television application implemented at least partially on the user equipment may generate the interactive television displays based on instructions received from television distribution facility 104.

In some embodiments, the interactive television application may be implemented locally on user equipment 110. In some embodiments, the interactive television application may be implemented in a distributed fashion (e.g., using a client-server architecture). In some embodiments, interactive television applications (e.g., interactive television program guides, web browsing and other Internet service applications, video-on-demand applications, game applications, communications (e.g., electronic-mail and chat) applications) may be provided as separate applications that are accessed through a navigation shell application (e.g., a menu application with menu options corresponding to the applications). In some embodiments, the features of such applications may be combined.

In some embodiments, system 100 also includes server 130, server 140 (in facility 104), service provider 142, and/or other devices of system 100 which may be used to support interactive television application functions including, for example, a network-based video recorder or a VOD application. For example, VOD content and video recorded using a network-based video recorder arrangement may be stored on server 140, server 130, or at service provider 142, and may be provided to user equipment 110 when requested by the interactive television application.

In some embodiments, an online interactive television application may be provided, for example, using a server (e.g., server 130) connected to communications network 126 over communications path 132. Server 130 may receive program schedule data and other data from data source 120 over communications path 124, communications network 126, and communications path 132, or over another suitable path or combination of paths.

In some embodiments, user equipment 110 may access the online interactive television application over an Internet communications link. For example, user equipment 110-*i* may access the online interactive television application implemented at least in part on server 130 through communications network 126 (e.g., using a cable modem) using communications path 136-*i* or through television distribution facility 104 using communications path 116-*i*.

In some embodiments, multiple platforms of user equipment 110 may access the online interactive television application or other server based interactive television application. This may provide a well structured and uniform interface across multiple user equipment platforms. Further, the online interactive television application may be operative as a universal back channel link to interactive television system 100.

The online interactive television application may be customized based on a user's individual preferences. The user's customizations may be applied to any suitable user equipment types and device that connect to the online interactive television application. The user equipment devices may then be synchronized by connecting the online interactive television application.

There are typically numerous system components (e.g., programming sources 102, television distribution facilities 104, servers 130 and 140, data sources 120, service providers 142) in system 100, but only one of each is shown in FIG. 1 to avoid overcomplicating the drawing. For clarity of the description, FIG. 1 includes N user equipments 110 with corresponding communication paths 116 and 136. The various communications paths (e.g., paths 106, 116, 122, 124, 132, 134, 136, 144, 146, and 152) of system 100 may be satellite paths, fiber-optic paths, cable paths, or any other suitable wired or wireless communications path or combination of such paths.

Figure 2:
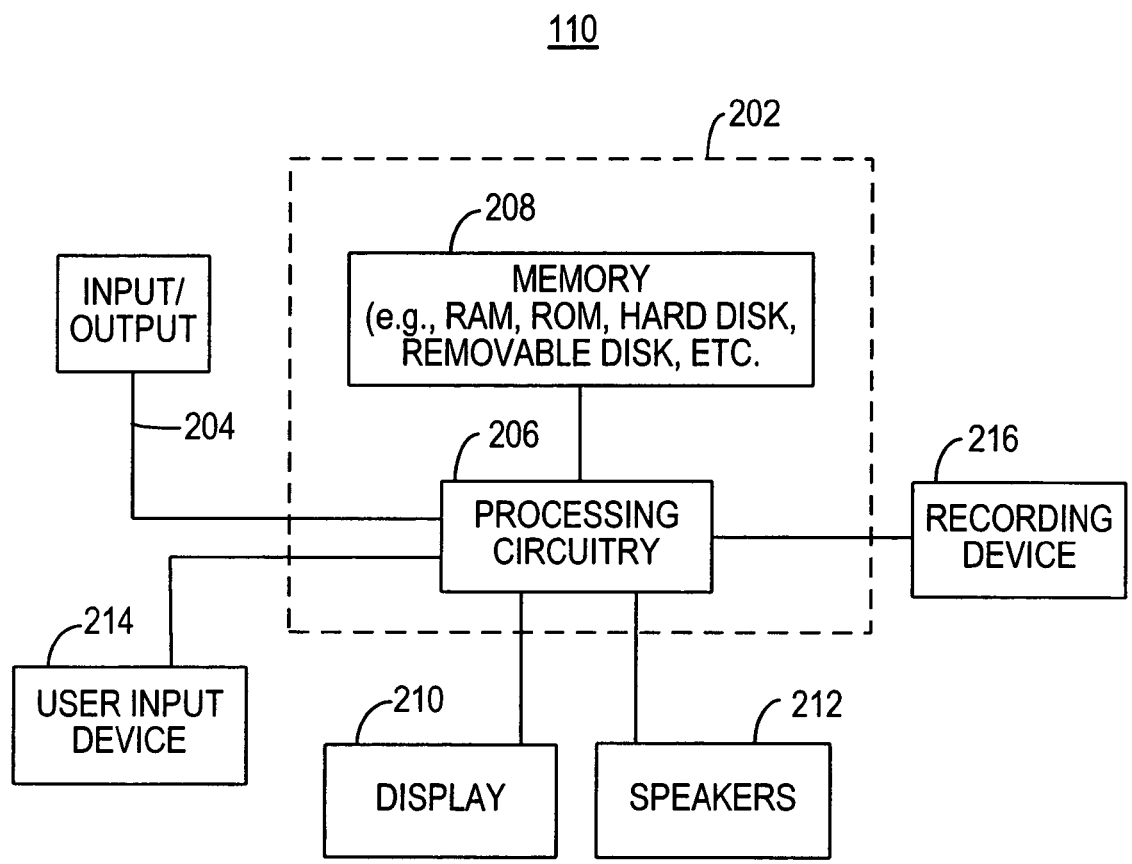
FIG. 2 is a diagram of illustrative user equipment in accordance with the present invention.

FIG. 2 shows illustrative components of user equipment 110 (FIG. 1). User equipment 110 includes control circuitry 202 (that includes processing circuitry 206 and memory 208), input/output (I/O) 204, display 210, speakers 212, user input device 214 and recording device 216. User equipment 110 may include any additional component, either as part of one of the aforementioned components or as a stand-alone component.

Control circuitry 202 includes any suitable processing circuitry 206 (e.g., one or more microprocessors, microcontrollers, digital signal processors, programmable logic devices). Processing circuitry 206 may also include tuning circuitry (e.g., one or more analog tuners to handle simultaneous watch and record functions or picture-in-picture (PIP) functions), MPEG-2 decoders or other digital video circuitry, decoding and encoding circuitry (e.g., for converting over-the-air or cable analog signals to MPEG signals for storage), or any other suitable tuning or video circuits. Control circuitry 202 also includes memory 208 (e.g., random-access memory (RAM), read-only memory (ROM), hard drives, DVD drives, CD drives, and server arrays). Processing circuitry 206 may provide instructions to memory 208.

In some embodiments, control circuitry 202 may be incorporated in a set-top box (e.g., an analog or digital set-top box, an integrated receiver decoder (IRD), a WebTV box). In some embodiments, control circuitry 202 may be incorporated in a personal computer coupled with a TV tuner card (e.g., a PCTV).

User equipment 110 communicates with system 100 through input/output (I/O) 204 using one or more communications paths (e.g., paths 116 and 136 of FIG. 1) leading to other devices of system 100. I/O 204 receives video and audio content (e.g., from programming sources 102, servers or other equipment such as server 130, service providers such as service provider 142, television distribution facility 104) and program schedule information and other data for an interactive television application from data source 120. In some embodiments, I/O 204 may include communications circuitry such as a cable modem, an integrated services digital network (ISDN) modem, a digital subscriber line (DSL) modem, a telephone modem, or a wireless modem for communications with other equipment. In some embodiments, the communications circuitry may be components of control circuitry 202. The communications using this communications circuitry may involve the Internet or any other suitable communications networks or paths.

Processing circuitry 206 may direct the tuning circuitry and decoding and encoding circuitry to receive, display, play or record video or audio content. Control circuitry 202 may direct display 210 to display video content and speakers 212 to play audio content. Display 210 may be a monitor, a television, a liquid-crystal display (LCD) screen, or any other suitable equipment for displaying visual images. Speakers 212 may be provided as part of user equipment 110 (e.g., display device 210) or may be stand-alone units.

Control circuitry 202 is connected to recording device 216, which may be used to record video and audio content received by control circuitry 202. Recording device 216 may be a digital video recorder (DVR), personal video recorder (PVR), a DVD recorder, a video cassette recorder (VCR), or any other device or devices with storage capabilities. In some embodiments, recording device 216 may be incorporated in user equipment 110 (e.g., as part of control circuitry 202), a stand alone device, or incorporated in another suitable device of system 100. In some embodiments, control circuitry 202 may direct recording device 216 to perform any suitable operation.

In some embodiments, recording device 216 may include communications circuitry such as a cable modem, an ISDN modem, a DSL modem, or a telephone modem for communications with other equipment. Such communications may involve the Internet or any other suitable communications networks or paths.

A user may control user equipment 110 (e.g., control circuitry 202, display device 210, speakers 212, recording device 216) using user input device 214. User input device 214 may be any suitable user interface, such as a mouse, trackball, keypad, keyboard, touch screen, touch pad, voice recognition interface, remote control, or any other suitable user input device. In some embodiments, user input device may be incorporated in another component of user equipment 110 (e.g., display device 210, recording device 216). User input device 214 may communicate with user equipment 110 by any suitable means including, for example, infrared, wired or wireless communications paths.

Figure 3:
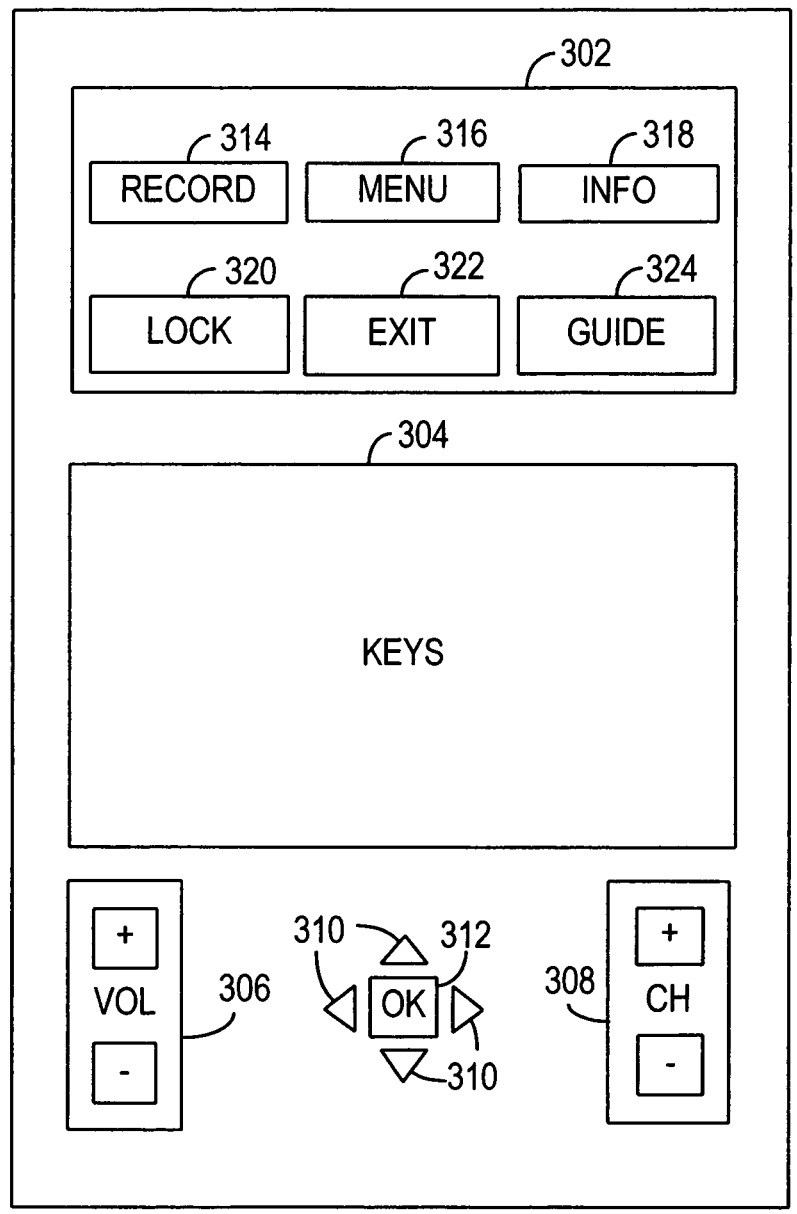
FIG. 3 is a diagram of an illustrative user input device in accordance with the present invention.

FIG. 3 shows illustrative user input device 214 for operating user equipment 110 (FIG. 1). User input device 214 is only illustrative and any other suitable user input interface may be used to operate user equipment 110 (e.g., a mouse, trackball, keypad, keyboard, touch screen, voice recognition system). User input device 214 includes function keys 302 and other keys 304 such as keypad keys, power on/off keys, pause, stop, fast-forward and reverse keys. Volume up and down keys 306 may be used for adjusting the volume of the audio portion of a video. Channel up and down keys 308 may be used to change television channels and to access content on virtual channels. Cursor keys 310 may be used to navigate on-screen menus. For example, cursor keys 310 may be used to position an on-screen cursor, indicator, or highlight (sometimes all generically referred to as a highlight or highlight region) to indicate interest in a particular option or other item on a display screen that is displayed by the interactive television application.

An OK key 312 (sometimes called a select or enter key) may be used to select on-screen options that the user has highlighted. Keys 302 may include a RECORD key 314 for initiating recordings. MENU button 316 may be used to direct the interactive television application to display a menu on the user's display screen (e.g., display device 210). INFO button 318 may be used to direct the interactive television application to display an information display screen. For example, when a particular program listing in an interactive television program listings display screen is highlighted, the user pressing INFO button 318 may cause the interactive television application to provide additional program schedule information associated with that program listing (e.g., a program description, actor information, etc.).

LOCK button 320 may be used to modify access privileges. For example, a parent may use LOCK button 420 or on-screen options to establish parental control settings for the interactive television application. The parental control settings may be time-based settings (e.g., to prevent a child from watching television during a particular time block such as from 3:00 PM to 5:00 PM). The parental control settings may also be used to block programming based on, for example, suitability-to-audience rating, channel, and program title. A locked or blocked program is typically not viewable until the interactive television application is provided with a suitable personal identification number (PIN). Once this PIN has been entered, the interactive television program will unlock the user's equipment and allow the locked content to be accessed.

EXIT button 322 may be used to exit the interactive television application or to exit a portion of the interactive television application. GUIDE button 324 may be used to invoke an interactive television program guide (e.g., a program guide menu screen, program listings screen, or other interactive television application screen).

The keys shown in FIG. 3 are merely illustrative. Other keys or buttons may be provided if desired. For example, the user input device may include MUSIC, PLAYLISTS, BACK, SEARCH, FIND, EDIT, or other suitable keys. Alphanumeric buttons, including other keyboard keys (e.g., SHIFT, CONTROL), may be used to enter alphanumeric characters. A LAST or BACK button may be used to browse backwards in the interactive television application (e.g., to return to a previous channel, web page or other display screen). Video recorder function buttons such as a play, pause, stop, rewind, fast-forward and record buttons, may be used to control video recorder functions (local or network-based) in system 100 (FIG. 1). A help key may be used to invoke help functions such as context-sensitive on-screen help functions.

Figure 4:
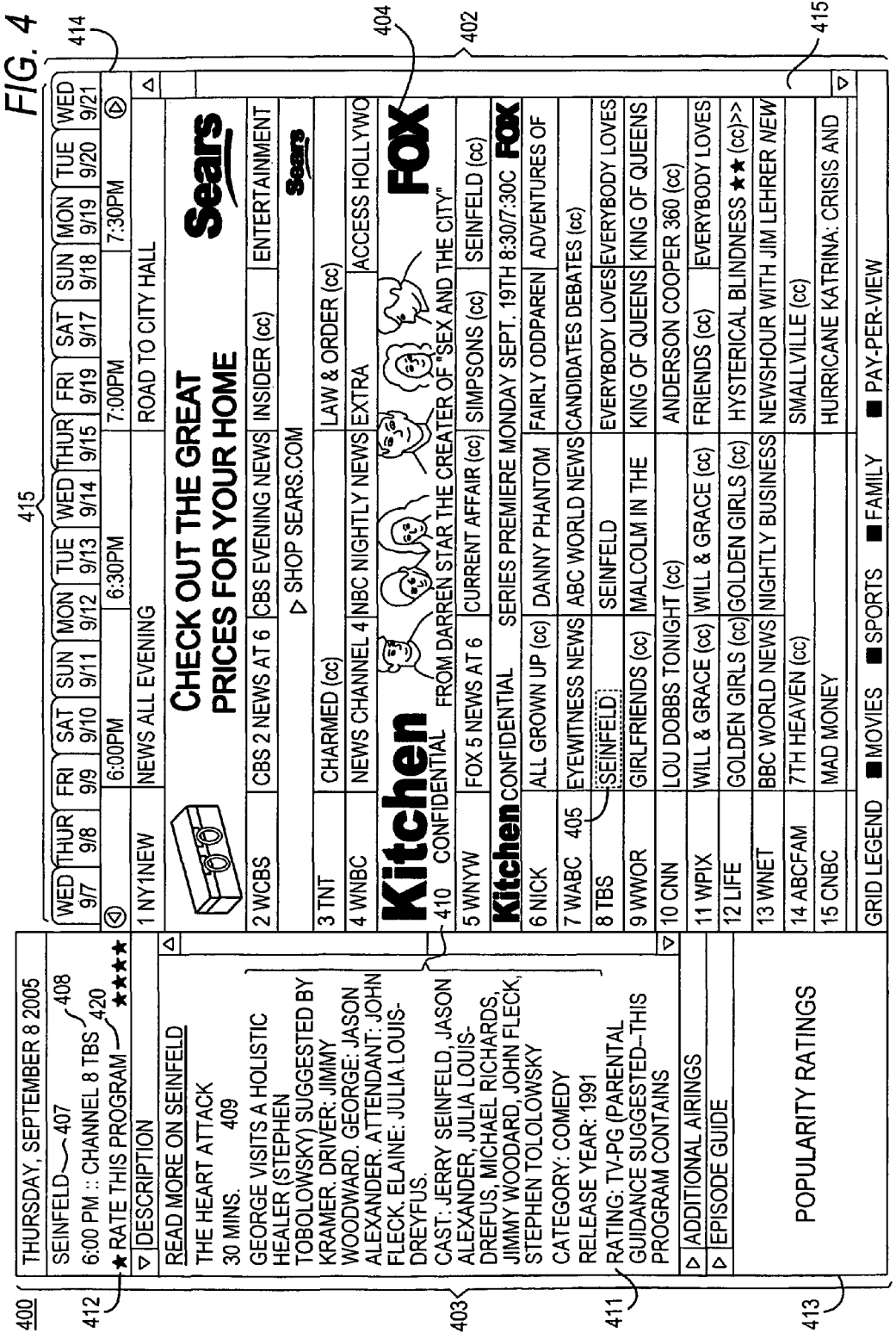
FIG. 4 is an illustrative online interactive program guide display screen in accordance with the present invention.

FIG. 4 shows illustrative online interactive television application interactive television program guide display screen 400. Display screen 400 includes grid guide 402 and information region 403. Grid guide 402 may contain a grid or list of program listings, such as program listing 405. The program listings may include program titles, channels, scheduled broadcast times, and any other suitable program schedule information. A user may browse grid guide 402 to view additional program listings. For example, scroll bar 414 may allow the user to change the broadcast time for which program listings are displayed in grid guide 402, scroll bar 415 may allow the user to change the channels for which program listings are displayed in grid guide 402, and tabs 416 may allow the user to change the date for which program listings are displayed in grid guide 402. Selecting a particular tab 416 may change the date for which program listings are displayed in grid guide 402, but may keep the time and channels substantially the same. Grid guide 402 may also include video, animations, or images containing advertisements or promotional information (e.g., channel advertisement 404). Advertisements and promotional information may be located throughout display screen 400.

When a program listing is selected information for selected program may appear elsewhere on display screen 400 (e.g., in program information region 403, in a drop-down window, or in a new window). Program information region 403 may include program schedule information, such as, for example, program title 407, channel number and logo 408, program run time 409, and program description 410.

Program information region 403 may also include suitability-to-audience rating 411, evaluative rating 412, and popularity rating 413. Suitability-to-audience ratings may include, for example, TV Parental Guidelines Rating for television programs and MPAA Ratings for movies. These suitability-to-audience ratings may assist parents in monitoring the programming that their children watch.

Evaluative ratings represent the perceived quality of a particular program. The evaluative rating may be a rank or grade according to a certain scale (e.g., four out of five stars or 8.3 out of 10.0 points) or may include a more comprehensive review of the program. The evaluative rating may reflect the opinion of a particular critic or group of critics or may be a compilation of the opinions of many users. For example, display screen 400 may contain link 420 which may allow a user to evaluate the selected television program based on a four star scale. Evaluative ratings for a single episode of a television program may represent that episode or the entire series.

Popularity ratings region 413 may provide predictive popularity ratings information, popularity ratings information that is primarily based on audience measurement data, or any other suitable popularity ratings information. Popularity ratings region 413 may provide programming recommendations based on the popularity ratings information. In some embodiments, popularity ratings information that is primarily based on audience measurement data may be visually distinguished from predictive popularity ratings to alert the user to the type of popularity ratings information provided.

Popularity ratings information may be provided for programming, such as television programs, pay-per-view (PPV) programs, near video-on-demand (NVOD) programs, video on demand (VOD) programs, music, advertisements, promotional materials, or any other video or audio media. Popularity ratings may include the audience size for a particular program (e.g., the number of people or households that watched the program), the market share of a particular program (e.g., the percentage of television viewers watching the program at a given time), or any other suitable information related to the popularity of a program or other media. For example, popularity ratings may be presented as a pie chart illustrating the program selected by the user compared with the other programs at that time slot. Alternatively, popularity ratings may be presented using any suitable passive or interactive text, graphics, animations, video, audio, any combination thereof, or any other suitable content.

In some embodiments, the popularity ratings may be displayed based on all available popularity ratings information. In other embodiments, popularity ratings information may be displayed for selected user segments or compared across multiple user segments. For example, popularity ratings may be displayed for a particular demographic, community group, geographic location, or platform type.

In some embodiments, programming recommendations based on popularity ratings, such as predictive popularity ratings, may also be provided within an interactive television application. In some embodiments, the programming recommendations may be tailored based on a user's interests, demographics, geographic regions, community group, or any suitable criteria. Interactive television systems that present graphical displays based on media usage are described for example in U.S. patent application Ser. No. 09/860,892, filed May 18, 2001. This application is incorporated by reference herein its entirety.

In an exemplary system in which cross-platform data (which is used to determine predictive popularity ratings) is collected from one particular type of platform (e.g., online interactive application platforms) and provided to another type of platform (e.g., a user television equipment platform).

Various user equipment platforms, such as personal computers, mobile phones, and PDAs may connect to an online interactive application server to provide access to an online interactive application. These online interactive application platforms may connect to the online interactive application server over any suitable wired or wireless communications paths or networks. The online interactive application server may be any suitable server, such as server 130 (FIG. 1) that may provide online interactive application features.

The online interactive application server may monitor user interactions with the online interactive application. For example, a user may access an online interactive application from a personal computer. The user may be provided with online interactive application features, such as those features illustrated in display screen 400 (FIG. 4). For example, a user may visit the tvguide.com Web site and select a program listing on the listings grid or search the program listings to obtain information on a particular program. Cross-platform data, such as monitored user interaction data (e.g., user selections or searches of the program listings on tvguide.com), may be transmitted from the online interactive application server to an audience measurement server over any suitable wired or wireless communications paths or networks. Cross-platform data may be stored in a database within the audience measurement server.

The audience measurement server may determine cross-platform predictive popularity ratings information based on the cross-platform data, and if desired any other additional data (e.g., historical data). The cross-platform predictive popularity ratings information may be transmitted to a user television equipment platform, which may display the cross-platform predictive popularity ratings information.

An illustrative interactive television application display screen may provide cross-platform predictive popularity ratings information on a user television equipment platform. This display screen may show the "Top 10 Upcoming Television Programs." These listed programs may be predicted by the audience measurement application to be the most popular television programs for a particular time period. These listed programs awe may be scheduled to be broadcast, for example, on Wednesday between 8:00 PM and 11:00 PM. In some other embodiments, predictive popularity ratings information may be displayed for other time periods, such as a half-hour, an evening, a day, a week, etc. This illustrative display screen may be displayed prior to the broadcast of these television programs based on cross-platform data previously collected by the audience measurement server from other interactive application platforms (e.g., an online interactive application platform). This display screen may be presented, for example, when a user selects a popularity ratings information icon within the interactive television application or presses a specific key on the remote control.

A cross-platform predictive popularity display screen may also display additional popularity ratings information. For example, the listing of top programs may contain statistics relating to the relative popularity of each of the listed programs. In this manner, the user may be able to see how much more popular the number one show is than the number ten show. The relative popularity information may include, for example, the predicted audience size, the percentage share, the number of user-interactions, or other suitable cross-platform data collected for each program. In some embodiments, the information provided within the display screen, including the time period, may be customized by the user. Further, the user may customize the displayed predictive popularity ratings information to display ratings information based on cross-platform data collected from a particular segment of users, such as a particular demographic, community group, geographic location, platform type, etc.

In addition to providing displayed screens showing the most popular upcoming television programs, the interactive television application may display cross-platform predictive popularity ratings information in other suitable display screens. For example, the interactive television application may use the cross-platform predictive ratings information to provide information on the most searched television programs, the television programs with the most scheduled reminders, the television programs with the most scheduled recordings, or any other suitable predictive popularity ratings information. In addition to providing information about the highest rated programming, the interactive television program may provide other popularity ratings information, such as, the lowest rated programming, the programming with largest increase or decrease in ratings, or the programming with the most stable ratings.

FIGS. 5-9 show additional illustrative interactive television program guide display screens that provide popularity ratings information, such as predictive popularity ratings information, on a display of a platform interspersed with program listings in accordance with the principles of the present invention.

Figure 5:
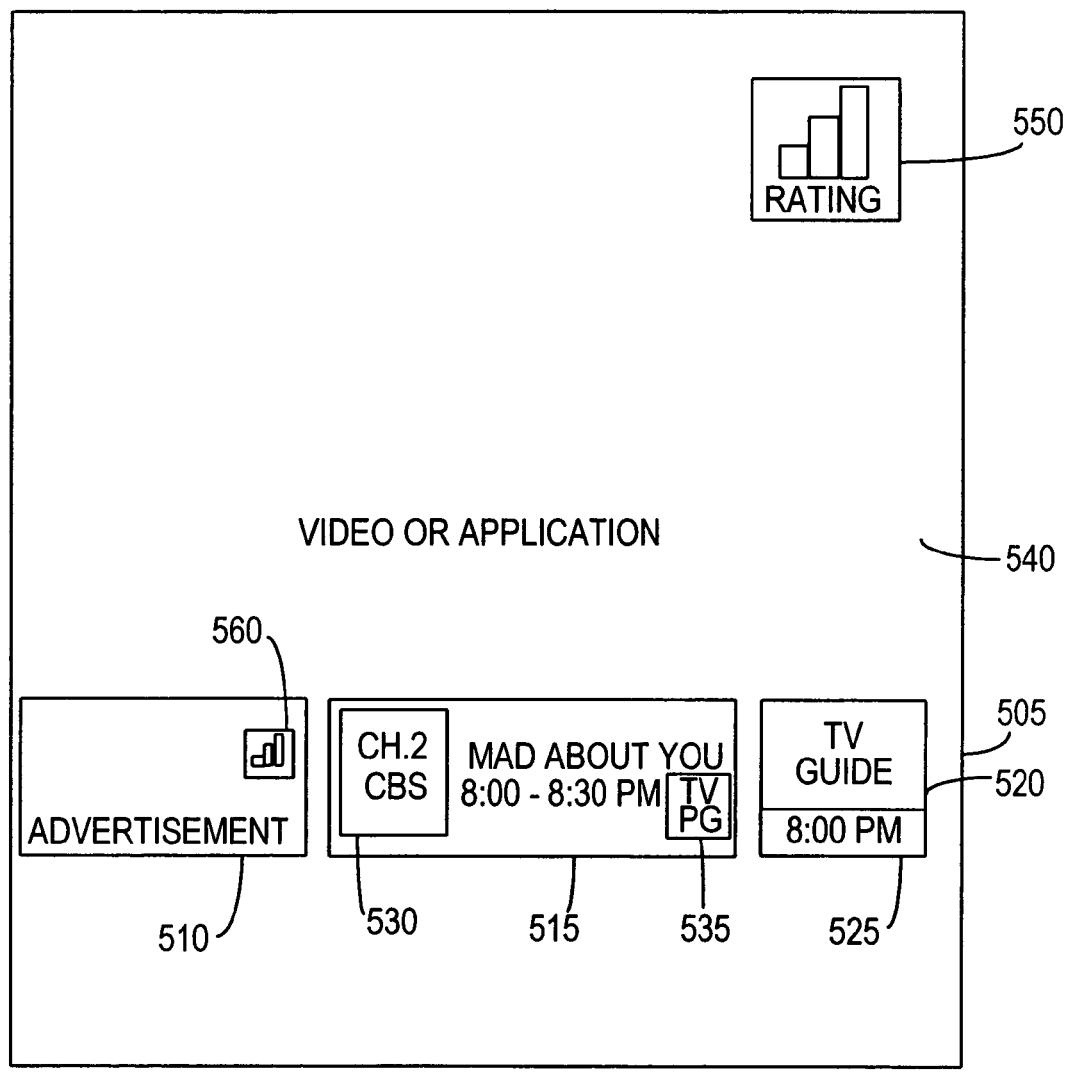
FIG. 5 is an illustrative display that may be displayed by the interactive television application when the user tunes to a channel in accordance with the present invention.

FIG. 5 shows illustrative interactive television application display screen 500 that may be displayed when the user flips through channels (e.g., flip display) on television equipment platforms. The display screen described herein may include flip bar 505 or a video or an application which is superimposed onto display screen 500. Flip bar 505 may, for example, identify the user's current channel and program. Flip bar 505 may provide the user with, for example, interactive advertisement 510, program description area 515, logo 520, and current time 525. In addition to program descriptions, program description area may also include channel indicator 530 and suitability-to-audience rating 535. Interactive advertisement 510 may be displayed as part of display screen 500. If desired, advertisement 510 may also be passive. Flip bar 505 may disappear (e.g., fade away) after a predetermined time of inactivity.

In some embodiments, popularity ratings information, such as predictive popularity ratings information, is displayed when, for example, users change channels. Popularity ratings information may be provided with flip displays, browse displays, program listings, advertisements, or any other suitable display. The popularity ratings information may be overlaid onto the program the user is watching, played over audio media, may be displayed when a user selects a program listing, may be displayed as the user browses or searches through program listings, may be displayed when a user selects recorded media for playback, or may be displayed when a user selects audience information icon 550. For example, display screen 500 may contain options for various program guide functions. When the user decides to flip to another program or another application by, for example, using the remote control, display screen 500 may present popularity ratings information relating to the user's current video or application.

In some embodiments, popularity ratings information, such as predictive popularity ratings information, may be presented upon the user's request. For example, popularity ratings information may be presented when the user selects popularity ratings information icon 550 or presses a specific key on the remote control when popularity ratings information icon 550 is displayed or highlighted. In some embodiments, popularity ratings information icon 550 or popularity ratings information may be displayed for a predetermined period of time when the user first accesses display 500, and then may disappear.

In some embodiments, popularity ratings information, such as predictive popularity ratings information, may be provided for advertisements or program promotions to determine the appeal of the advertisements. Advertisement popularity ratings information 560 may include the audience size for the advertisement, the market share of the advertisement, or any other suitable information. Advertisement popularity ratings information 560 may be overlaid onto advertisement 510, may be displayed when a user selects advertisement 510, may be displayed as the user browses through advertisements, may be displayed when a user selects recorded media for playback, or using any other suitable approach.

Figure 6:
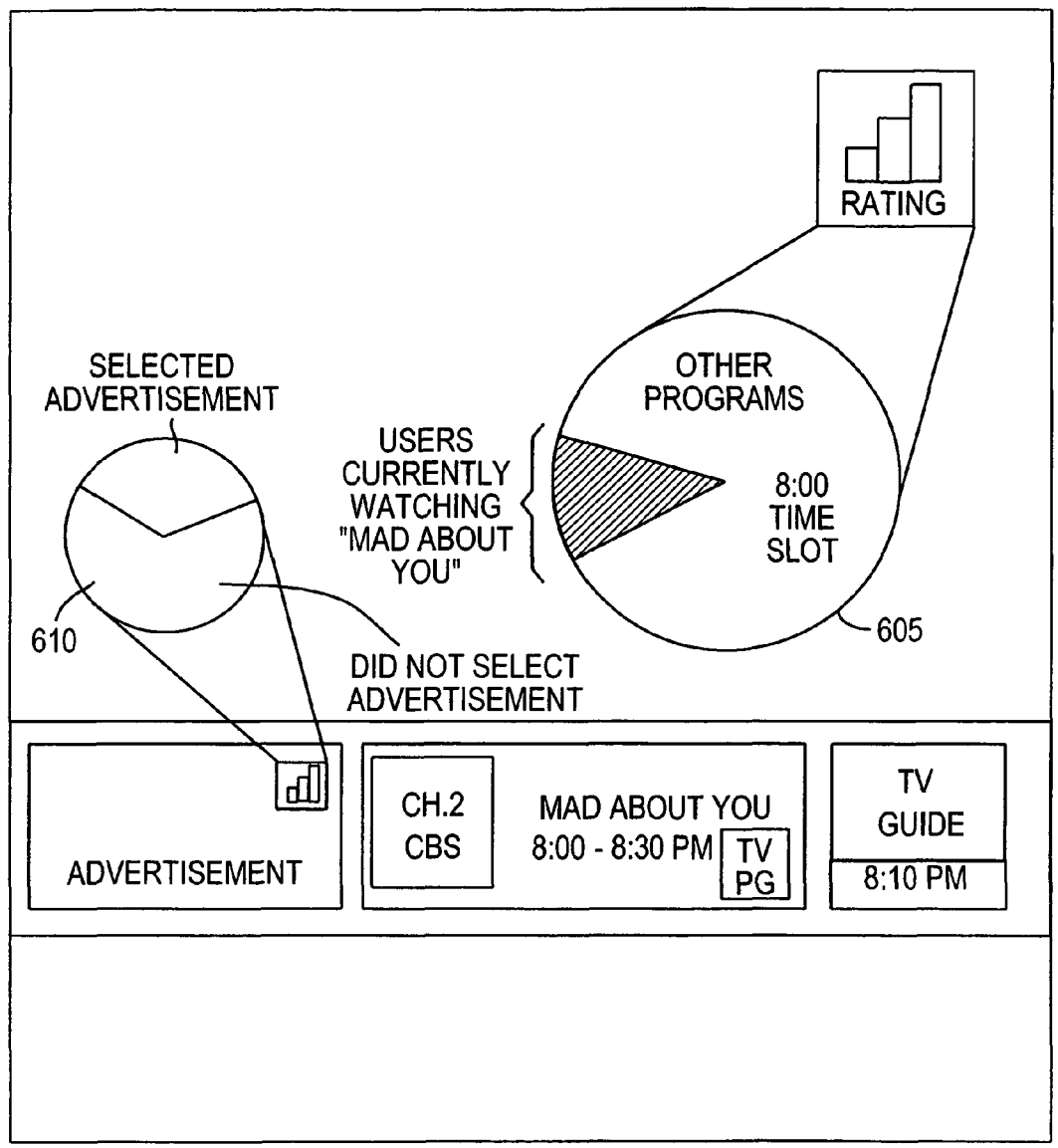
FIG. 6 is an illustrative display that presents the user with ratings information in accordance with the present invention.

FIG. 6 shows illustrative interactive television application display screen 600. Display screen 600 include illustrative graphics 605 and 610 containing popularity ratings information that may be overlaid over display screen 500.

Figure 7:
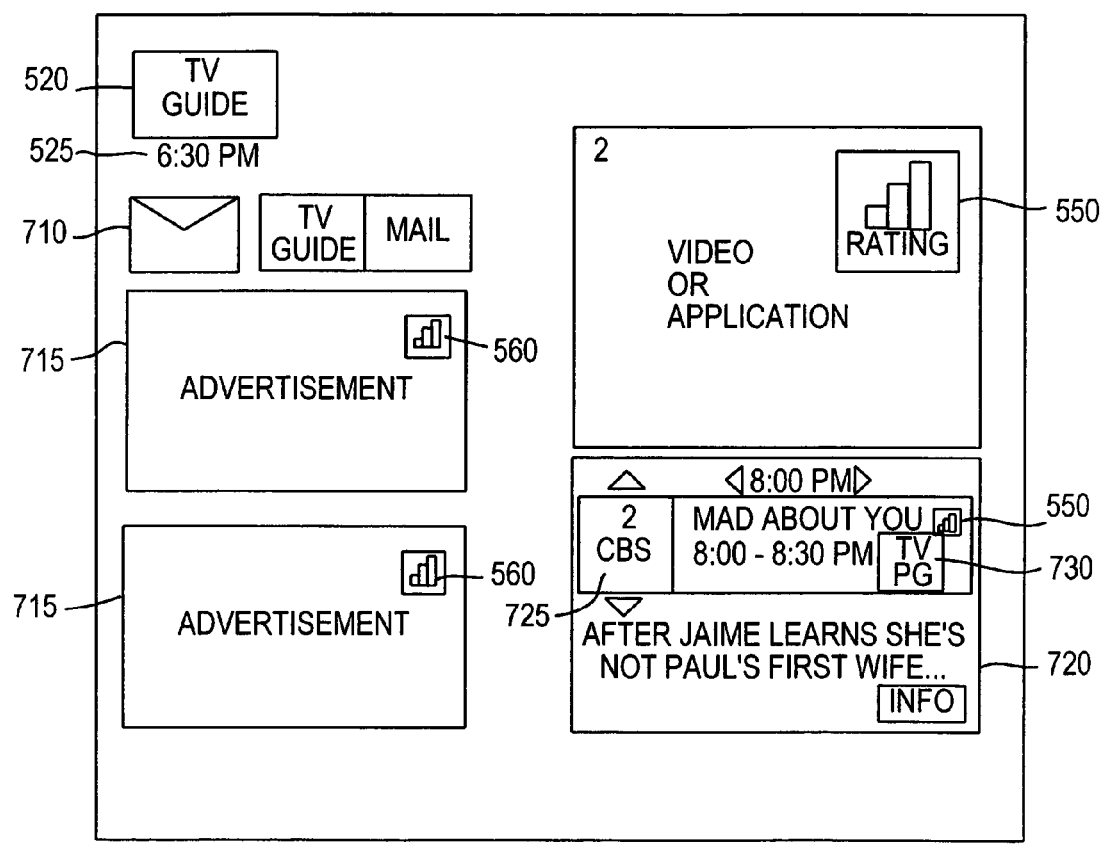
FIG. 7 is an illustrative display that may be displayed by the interactive television application when the user browses through programs in accordance with the present invention.
Figure 8:
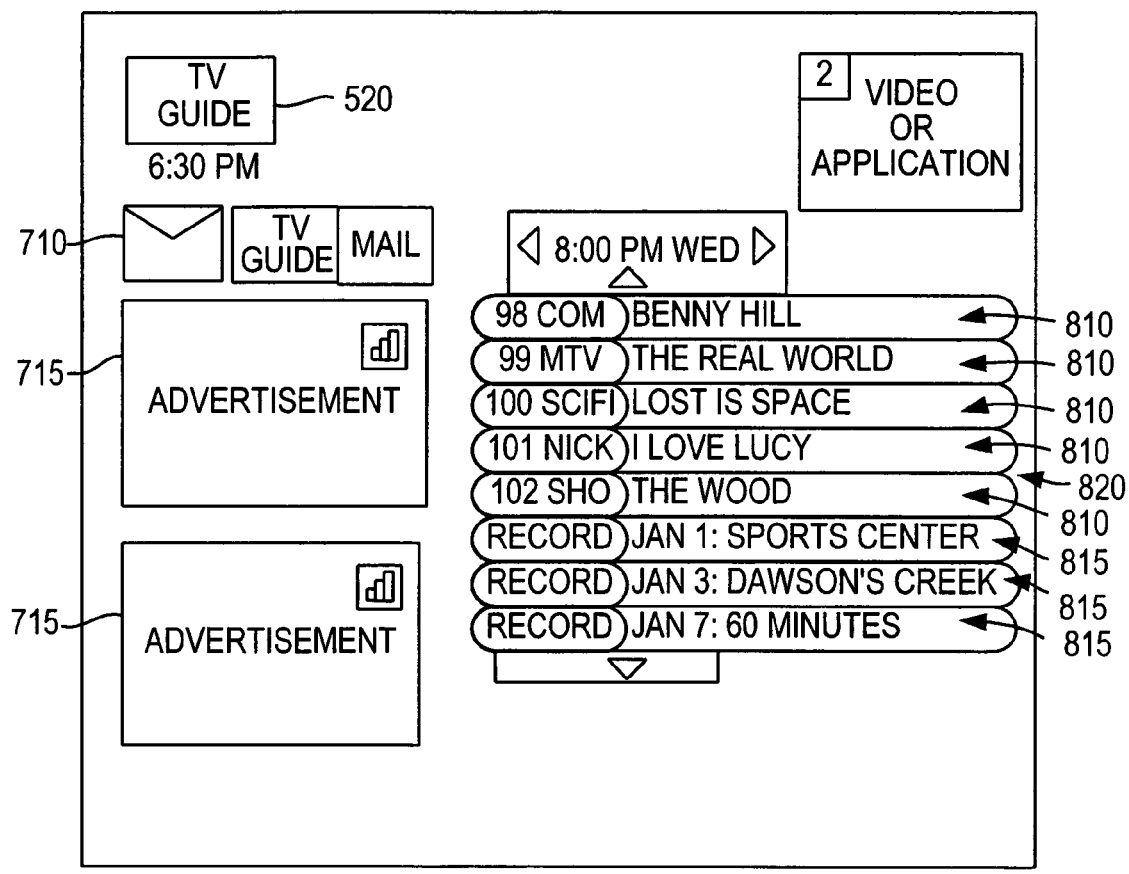
FIG. 8 is an illustrative display that may be displayed by the interactive television application when the user browses through media listings in accordance with the present invention.

FIG. 7 shows illustrative interactive television application browse display screen 700. Display screen 700 may, for example, allow users to continue watching a program on a particular channel while browsing information for programs that are playing on other channels and at other times. In another approach, browse display screen 700 may, for example, be similar to flip display screen 500. Display screen 700 may include a number of graphics and advertisements, such as, for example, logo 520, time 525, mail 710, interactive advertisements 715, and any other suitable graphics or advertisements. One or more interactive advertisements 715 may be displayed as part of display screen 700. If desired, advertisements 715 may also be passive.

Display screen 700 may allow users to indicate a desire to browse through program listings for other channels and time slots by, for example, pressing "up", "down", "left", and "right" arrows on the remote control. Display screen 700 may include the user's current video or application which is superimposed onto display screen 700. Display screen 700 may also include browse bar 720 that may, for example, identify the user's selected channel and program. In addition to program descriptions, browse bar 720 may also include channel indicator 725 and suitability-to-audience rating 730. Display screen 700 may also include popularity ratings information. Display screen 700 may also include popularity ratings information icon 550. Popularity ratings information or popularity ratings information icon 550 may be overlaid onto the user's currently selected video or application. Popularity ratings information icon 550 may also be overlaid onto browse bar 720. Popularity ratings information may provide the user with predictive or actual audience size for a particular program, the market share of a particular program, or any other suitable information related to the current program or the selected program. The system may present popularity ratings information and popularity ratings information icon 550 using any suitable passive or interactive text, graphics, animations, video, audio, any combination thereof, or any other suitable content.

The interactive television application or any other guidance application may present popularity ratings information, such as predictive popularity ratings information, with program listings. For example, illustrative display screen 800 of FIG. 8 may be displayed by an interactive television application to provide users with program listings for broadcast and recorded programs. Display screen 800 includes program listings region 820 that contains one or more program listings (e.g., listings 810, listings 815). One or more listings 810 may provide the user with information about programs on specific channels showing at a particular time. Listings 810 includes the names of programs showing at 8:00 PM on channel 98 through channel 102. However, listings 810 and listings 815 may include other media related information, such as program descriptions, popularity ratings information (or an icon indicating the availability of popularity ratings information), and other suitable information. Display 800 may provide listings 815 so that the user may access listings of recorded media. Listings 815 includes the names of programs and the date of recordation. Display screen 800 may also include logo 520, advertisements 715, mail 710, any other graphics, any other animations, or any other suitable content.

As illustrated, program listings region 820 provides program listings in a list and displays the channel number, call letters, and program title for a given time slot. The listings shown is merely illustrative. Any other suitable approach may be used.

Figure 9:
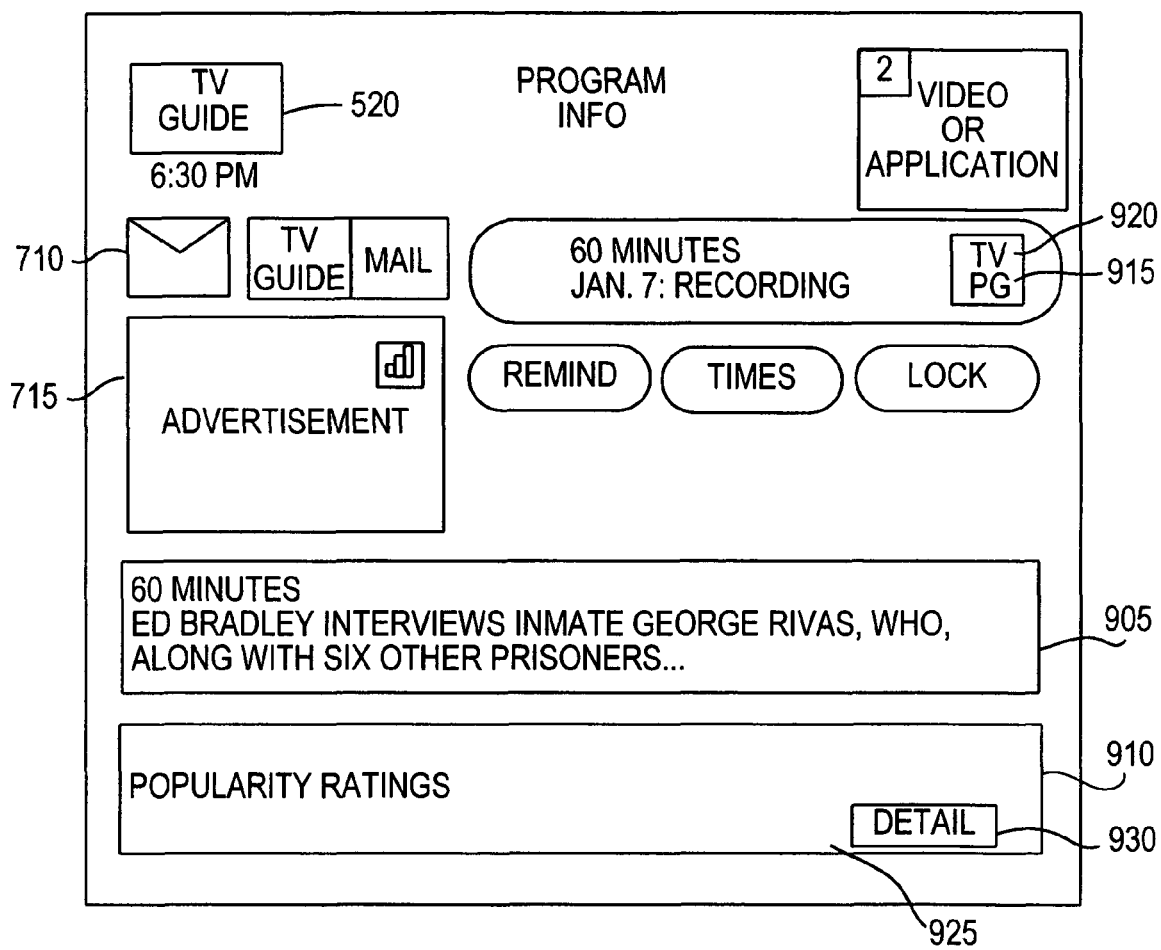
FIG. 9 is an illustrative display that may be displayed by the interactive television application for providing the user with additional information for media in accordance with the present invention.

A user may indicate a desire to access additional information for a listing by, for example, selecting a listing. Upon the user selecting a listing, such as "January 7: 60 Minutes," the interactive television application may present additional program information. An illustrative display screen 900 is shown in FIG. 9. Display screen 900 may include, for example, the title of the program (e.g., in title area 915), a description of the program (e.g., description 905), the suitability-to-audience rating of the program (e.g., rating 920), or any other suitable information. If the program was recorded by the user, display 900 may provide the date and time of recording. If the program will be aired, display 900 may, for example, present the user with the channel and time when the program will be aired.

Program information display screen 900 may also provide the user with popularity ratings information, such as predictive popularity ratings information. Popularity ratings information area 910 may include, for example, the number of times the program has been played back, the audience size or the market share of the program that is currently being viewed or recorded, or any other suitable information. Popularity ratings information area 910 also includes "DETAIL" button 925. As shown, the user may select "DETAIL" button 925 by placing highlight region 930 over button 925 and, for example, pressing "OK" key on the remote control. "DETAIL" button 925 may provide the user with additional popularity ratings information. Popularity ratings information area 910 may include any suitable interactive or passive text, graphics, animations, audio, video, any combination thereof, or any other suitable context. As in any display screen described, display screen 900 may also include a number of graphics, animations, selectable advertisements, video windows, or any other suitable content.

FIGS. 10-14 are flowcharts of steps involved in providing various features and embodiments of the present invention. In practice, one or more of the steps shown may be combined with other steps, performed in any suitable order, or deleted.

Figure 10:
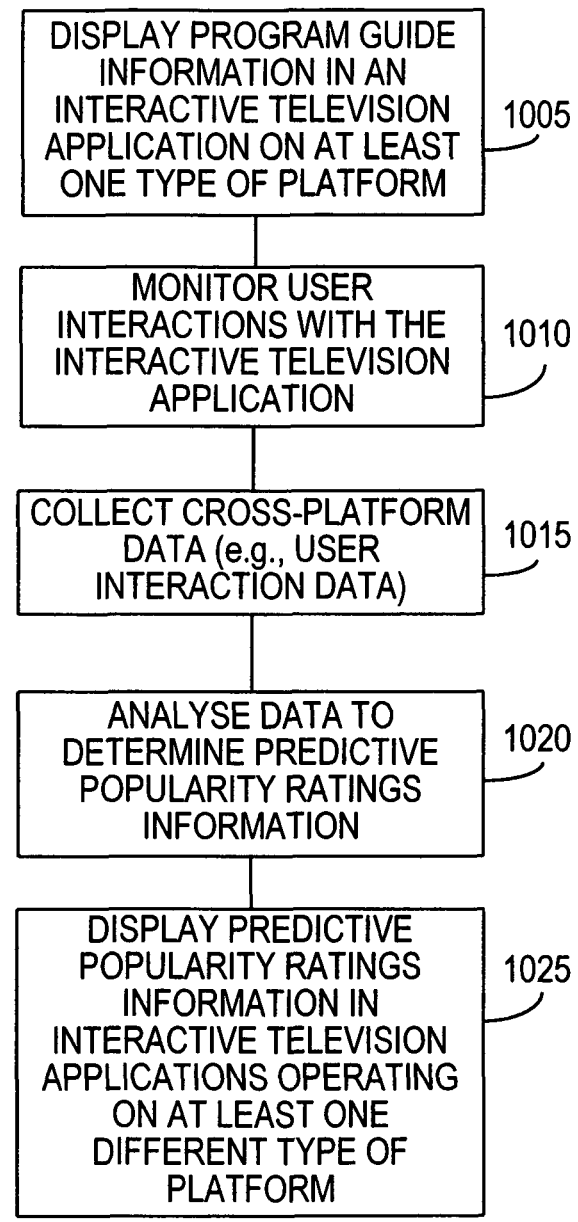
FIG. 10 is a flowchart of steps involved in providing predictive popularity ratings information in accordance with the present invention.

FIG. 10 is a flowchart of illustrative steps involved in providing cross-platform predictive popularity ratings information in accordance with one embodiment of the present invention. At step 1005, program guide information is displayed in an interactive television application implemented on at least one type of platform. For example, program guide information may be displayed in an online interactive television application operating a computer platform (or another online interactive application platform). At step 1010 user interactions with the interactive television application are monitored. For example, the interactive television application may monitor any user interactions that may indicate user interest in any of content or features provided by an interactive television application. The monitored user interaction data may be collected by an audience measurement application at step 1015. As previously discussed, additional types of cross-platform data may also be collected. At step 1020 the collected data may be analyzed to determine predictive popularity ratings information. Illustrative steps involved in analyzing cross-platform data to determine predictive popularity ratings information are discussed below in FIGS. 11-13. At step 1025 the predictive popularity ratings information may be displayed in interactive television applications operating on at least one platform of a type that is different than the type being monitored. For example, the predictive popularity ratings information may be displayed in an interactive television application operating on a user television equipment platform. In some embodiments, the interactive television application may display popularity ratings information based on all of the available popularity ratings information. In other embodiments, the popularity ratings information may be displayed for only a segment of user based on criteria, such as demographics, community group, geographic location, platform type, etc. A user may also compare popularity ratings amongst different user segments.

Figure 11:
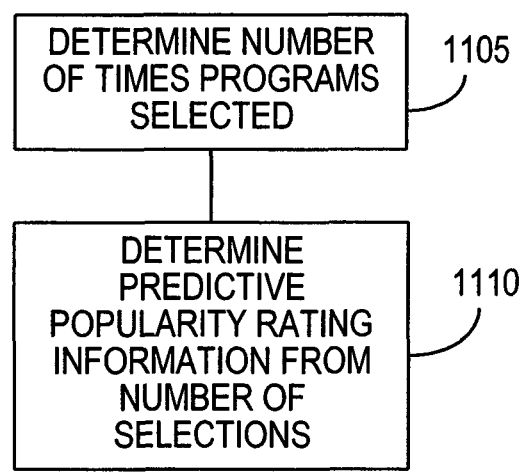
FIGS. 11-13 are flowcharts of steps involved in exemplary methods for analyzing cross-platform data to determine predictive popularity ratings information in accordance with the present invention.
Figure 12:
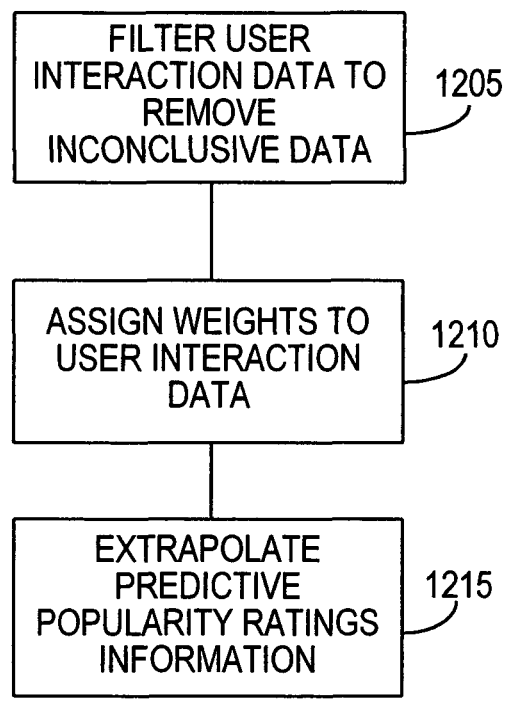
Figure 13:
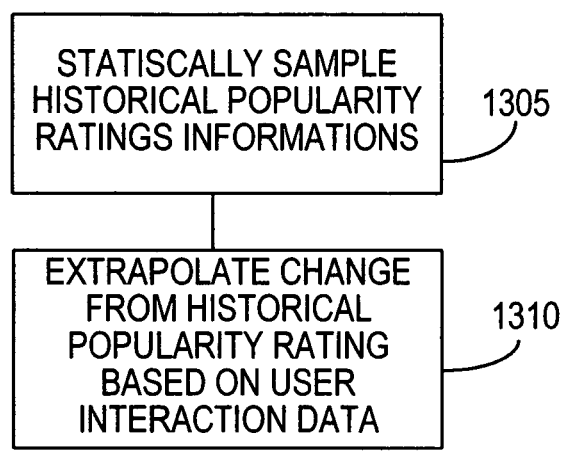

FIGS. 11-13 are flowcharts of steps involved in exemplary methods for analyzing user interaction data (or cross-platform data) to determine predictive popularity ratings information. At step 1105 of FIG. 11 the numbers of times each program is selected in an interactive television program guide is counted. At step 1110 predictive popularity ratings information is determined based on the number of times each program is selected. In some embodiments, the number of selections may be multiplied by a constant or applied to a function to determine the predicted size of the audience. In some embodiments a conversion table or chart may be used to convert the number of selections to a predicted audience size. Alternatively, the relative number of clicks received by each program at a particular timeslot may be used to determine the relative popularity ratings or audience share of the programs. Similarly, other user interactions, such as browsing program descriptions, searching program listings, and selecting options associated with a particular program listing may also be used to determine predictive popularity ratings information.

FIG. 12 is a flowchart of steps involved in another exemplary method for analyzing user interaction data to determine predictive popularity ratings information. At step 1205 the collected user interaction data is filtered to remove irrelevant or inconclusive user interaction data. For example, the selections of unregistered users may be removed. As another example, user selections of multiple programs at a single timeslot may also be removed. At step 1210 the remaining user interaction data may be assigned weights based on the significance or relevance of the data. For example, user set program reminders may be given more weight than the selection of a program listing. Elements that may be considered in assigning weight may include, for example, the nature of the interaction, the time of the interaction, the location of the interaction within the interactive television application, the type of interactive television application platform, the type of user equipment, user profile information, etc. Finally, at step 1215 the predictive popularity ratings information may be extrapolated from the weighted user interaction data.

FIG. 13 is a flowchart of steps involved in another exemplary method for analyzing user interaction data to determine predictive popularity ratings information. At step 1305 historical popularity ratings and audience measurement information is statistically sampled to set a baseline popularity ratings information. For example, the baseline popularity ratings information may be set to the mean, median, or mode of the historical ratings information. At step 1310 the user interaction data may be analyzed to determine a difference between the baseline popularity ratings information and predictive popularity ratings information. For example, a significant number of user interaction related to a particular program may indicate increased popularity ratings. A baseline for user interaction may also be calculated in order to determine the relative significance of a particular user interaction level. Further analysis of historical popularity ratings and audience measurement information may also be used to determine predictive popularity ratings information. For example, historical popularity ratings information may be used to accurately predict popularity ratings information for a program having consistent popularity ratings.

Figure 14:
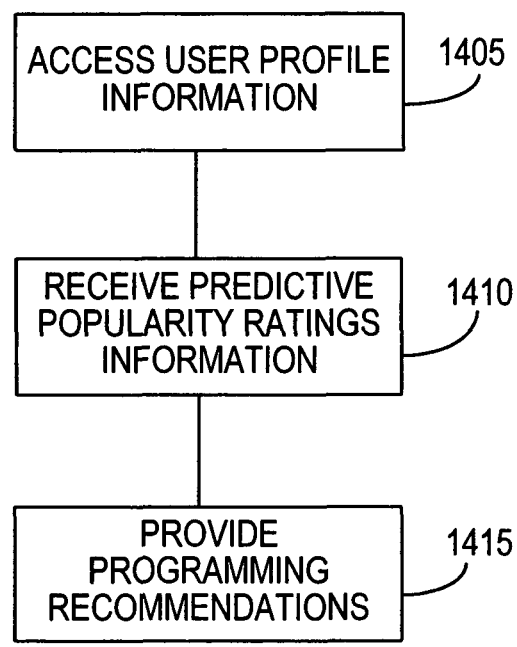
FIG. 14 is a flowchart of steps involved in providing programming recommendations based on predictive popularity ratings information in accordance with the present invention.

FIG. 14 is a flowchart of steps involved in providing recommended programming options based on predictive popularity ratings information. At step 1405, an indication is received by the interactive television application that the user is accessing his or her profile. At step 1410 the interactive television application may receive predictive popularity ratings information. At step 1415 the interactive television application may recommend programming based at least in part on user profile information and the predictive popularity ratings information.

In some embodiments, programs that receive the highest popularity ratings information may be recommended. In other embodiments, programming may be recommended based on the user's interests. Programming may be recommended based on a user's status with respect to user segments, such as demographics, community groups, geographic location, platform type. A user may also specify the type of program to be recommended by desired criteria (e.g., time, date, channel, duration, genre, target market, actor, writer, popularity ratings, etc.).

One skilled in the art will appreciate that the invention can be practiced by other than the prescribed embodiments, which are presented for purposes of illustration and not of limitation, and the invention is limited only by the claims which follow.

What is claimed is:

1. A method for providing cross-platform predictive popularity ratings of programming, the method comprising:
   transmitting program guide information for display in interactive television applications on a plurality of platform types;
   monitoring user selections of the program guide information displayed on the plurality of platform types;
   collecting data on the monitored user selections of the displayed program guide information from the plurality of platform types, wherein the collected data is assigned different weights based on a degree to which use of the platform type of the plurality of platform types from which the data was collected is indicative of user interest in programming;
   analyzing the weighted collected data to determine predictive popularity ratings of programming, the predictive popularity ratings indicating a projected audience size for programming to be broadcast in the future; and
   transmitting the predictive popularity ratings for display in an interactive television application.

2. The method of claim 1 wherein one of the plurality of platform types comprises user television equipment.

3. The method of claim 1 wherein one of the plurality of platform types comprises an online interactive application platform.

4. The method of claim 1 wherein the program guide information selected by the user comprises program listings information.

5. The method of claim 4, wherein the selected program listings information is programming to be broadcast in the future.

6. The method of claim 1 wherein analyzing the collected data comprises filtering the collected user selection data.

7. The method of claim 1 wherein determining the predictive popularity ratings of programming comprises counting the number of collected selections from a plurality of users selecting the programming in the interactive television applications implemented on the plurality of platform types.

8. The method of claim 1 wherein determining predictive popularity ratings of programming further comprises accessing historical popularity ratings information.

9. The method of claim 1 further comprising recommending programming to the user based on the predictive popularity ratings.

10. A system for providing cross-platform predictive popularity ratings of programming, the system comprising a plurality of platform types and an audience measuring system, the audience measuring system operative to:
    collect data on user monitored selections of program guide information displayed by interactive television applications operating on the plurality of platform types, wherein the collected data is assigned different weights based on a degree to which use of the platform type of the plurality of platform types from which the data was collected is indicative of user interest in programming;
    analyze the weighted collected data to determine predictive popularity ratings of programming, the predictive popularity ratings indicating a projected audience size for programming to be broadcast in the future; and
    distribute the predictive popularity ratings to the plurality of platform types.

11. The system of claim 10 wherein one of the plurality of platform types comprises user television equipment.

12. The system of claim 10 wherein one of the plurality of platform types comprises an online interactive application platform.

13. The system of claim 10 wherein the program guide information selected by the user comprises program listings information.

14. The system of claim 13, wherein the selected program listings information is programming to be broadcast in the future.

15. The system of claim 10 wherein the audience measuring system is further operative to filter the collected user selection data to assist in determining the predictive popularity ratings.

16. The system of claim 10 wherein the audience measuring system is further operative to count the number of collected selections from a plurality of users selecting the programming in the interactive television applications implemented on the plurality of platform types to assist in determining the predictive popularity ratings.

17. The system of claim 10 wherein the audience measuring system is further operative to access historical popularity ratings information to assist in determining the predictive popularity ratings.

18. The system of claim 10, wherein the interactive television applications display the predictive popularity ratings.

19. A method for providing cross-platform predictive popularity ratings, comprising:
    monitoring user interactions with interactive television applications operating on at least two predetermined platforms of a plurality of platform types to obtain cross-platform data, wherein the cross-platform data is assigned different weights based on a degree to which use of the platform type of the plurality of platform types from which the cross-platform data was collected is indicative of user interest in programming;

determining predictive popularity ratings information based on the weighted cross-platform data, the predictive popularity ratings indicating a projected audience size; and distributing the predictive popularity ratings information for use in an interactive television application operating in at least one of the plurality of platform types.

20. The method of claim 19, further comprising transmitting the predictive popularity ratings for display in the interactive television applications.

21. A system for providing cross-platform predictive popularity ratings, the system comprising equipment for supporting operation of a cross-platform application, the cross-platform application operative to:

monitor user interactions with interactive television applications operating on at least two predetermined platforms of a plurality of platform types to obtain cross-platform data, wherein the cross-platform data is assigned different weights based on a degree to which use of the platform type of the plurality of platform types from which the cross-platform data was collected is indicative of user interest in programming;

determine predictive popularity ratings information based on the weighted cross-platform data, the predictive popularity ratings indicating a projected audience size; and distribute the predictive popularity ratings information for use in an interactive television application operating in at least one of the plurality of platform types.

22. The system of claim 21, wherein the interactive television applications display the predictive popularity ratings information.

23. A method for providing cross-platform predictive ratings, the method comprising:

transmitting cross-platform predictive ratings for display in an interactive television application operating on at least one predetermined platform of a plurality of platform types, the predictive ratings indicating a projected audience size; and generating the cross-platform predictive ratings based on data received from user interactions with interactive television applications operating on at least two platforms of the plurality of platform types, wherein the data is assigned different weights based on a degree to which use of a platform type of the plurality of platform types from which the data was collected is indicative of user interest in programming.

* * * * *

UNITED STATES PATENT AND TRADEMARK OFFICE
CERTIFICATE OF CORRECTION

| | | |
|---|---|---|
| PATENT NO. | : 8,613,024 B2 | Page 1 of 1 |
| APPLICATION NO. | : 11/300146 | |
| DATED | : December 17, 2013 | |
| INVENTOR(S) | : Bovenschulte et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 702 days.

Signed and Sealed this
Twenty-first Day of April, 2015

Michelle K. Lee
*Director of the United States Patent and Trademark Office*